US012028101B2

(12) United States Patent
Banerjee et al.

(10) Patent No.: US 12,028,101 B2

(45) Date of Patent: Jul. 2, 2024

(54) RECEIVE CHAIN LINEARIZATION VIA TIME-INTERLEAVED AND POLYPHASE MIXING OF INTERLEAVED PATHS

(71) Applicant: Analog Devices International Unlimited Company, Limerick (IE)

(72) Inventors: Debopam Banerjee, Bangalore (IN); Mark Alan Lemkin, Berkeley, CA (US)

(73) Assignee: Analog Devices International Unlimited Company, Limerick (IE)

( * ) Notice: Subject to any disclaimer, the term of this patent is extended or adjusted under 35 U.S.C. 154(b) by 270 days.

(21) Appl. No.: 17/520,426

(22) Filed: Nov. 5, 2021

(65) Prior Publication Data

US 2023/0144573 A1 May 11, 2023

(51) Int. Cl.
*H04B 1/12* (2006.01)

(52) U.S. Cl.
CPC .................................... *H04B 1/123* (2013.01)

(58) Field of Classification Search
CPC ...................................................... H04B 1/123
USPC .................................. 455/132; 375/316, 349
See application file for complete search history.

(56) References Cited

U.S. PATENT DOCUMENTS 8,823,572 B2 9/2014 Lemkin
9,160,468 B1 * 10/2015 Pullela ................. H04N 21/615
9,236,960 B1 * 1/2016 Tinella ............... H04B 17/0085
10,128,859 B1 11/2018 Rajasekhar et al.
10,778,188 B1 9/2020 Karmaker
11,158,944 B2 * 10/2021 Schrattenecker ........ H01Q 3/36
2007/0058739 A1 * 3/2007 Aytur .................. H03G 3/3068 375/345

(Continued)

FOREIGN PATENT DOCUMENTS

EP 2337217 6/2011

OTHER PUBLICATIONS

Shrestha et al., *A Polyphase Multipath Technique for Software-Defined Radio Transmitters*, IEEE Journal of Solid-State Circuits, vol. 41, No. 12, Dec. 2006, 12 pages.

(Continued)

*Primary Examiner* — Don N Vo
(74) *Attorney, Agent, or Firm* — ArentFox Schiff LLP

(57) ABSTRACT

Systems, devices, and methods related to time-interleaved polyphase linearization for a receive signal chain are provided. An example receive signal chain includes an input node to receive a radio frequency (RF) signal. The receive signal chain further includes a plurality of polyphase mixer circuitries including first mixers and first local oscillators to generate a plurality of phase-shifted downconverted signals based on the received RF signal. The receive signal chain further includes a first multiplexer to select one of the plurality of phase-shifted downconverted signals during each time slot of a plurality of time slots. The receive signal chain further includes signal conditioning circuitry comprising at least one nonlinear component. The signal conditioning circuitry conditions, during each time slot, a respective selected one of the plurality of phase-shifted downconverted signals to generate a conditioned signal. The receive signal chain further includes analog-to-digital-converter (ADC) downstream of the signal conditioning circuitry.

20 Claims, 9 Drawing Sheets

(56) References Cited

U.S. PATENT DOCUMENTS

2017/0288764 A1 * 10/2017 Croman .............. H04B 1/0064

OTHER PUBLICATIONS

Liang et al., *A Fast-Switching Frequency Synthesizer for UWB Applications*, © 2005 IEEE, 4 pages.
Goodman et al., *Polyphase Nonlinear Equalization of Time-Interleaved Analog-to-Digital Converters*, Selected Topics in Signal Processing, IEEE Journal of 3.3 (2009), Institute of Electrical and Electronics Engineers, 13 pages.
Mensink et al., *Distortion Cancellation by Polyphase Multipath Circuits*, IEEE Transactions on Circuits and Systems—I: Regular Papers, vol. 52, No. 9, Sep. 2005, 10 pages.
Anderson et al., *A Filtering ΔΣ ADC for LTE and Beyond*, IEEE Journal of Solid-State Circuits, vol. 49, No. 7, Jul. 2014, 13 pages.

* cited by examiner

RECEIVE CHAIN LINEARIZATION VIA TIME-INTERLEAVED AND POLYPHASE MIXING OF INTERLEAVED PATHS

TECHNICAL FIELD OF THE DISCLOSURE

The present disclosure generally relates to integrated circuits and, more specifically, to receive chain linearization via time-interleaved and polyphase mixing of interleaved paths.

BACKGROUND

Both, systems used for wireless communication such as Long Term Evolution (LTE) and $5^{th}$ generation (5G), and systems used for cable communication such as cable television networks, are radio systems in that they transmit and receive signals in the form of electromagnetic waves in the radio frequency (RF) range of approximately 3 kiloHertz (kHz) to 300 gigaHertz (GHz).

In a communications system, a transmitter may process data to generate a modulated signal, and transmit the modulated signal via a communication channel (e.g., a wireless channel) to a receiver. The receiver may receive the transmitted signal and attempt to recover the data sent by the transmitter. In some instances, the received signal may be corrupted by noise, distortion, interference, and/or intermodulation products arising from nonlinear characteristics of the receiver itself. For instance, a radio frequency (RF) receiver may include amplifier(s) and/or filter(s) in the signal paths for conditioning a received signal. The amplifier(s) and/or filter(s) may include nonlinear circuit components, which may generate high-order signal components (e.g., nonlinearity) while processing a received signal. The nonlinearity can result in in-band or adjacent channel jammers, impacting system performance for the receiver itself as well as receivers operating in adjacent channels. Accordingly, processing techniques for improving nonlinearity at a receiver may be desirable.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
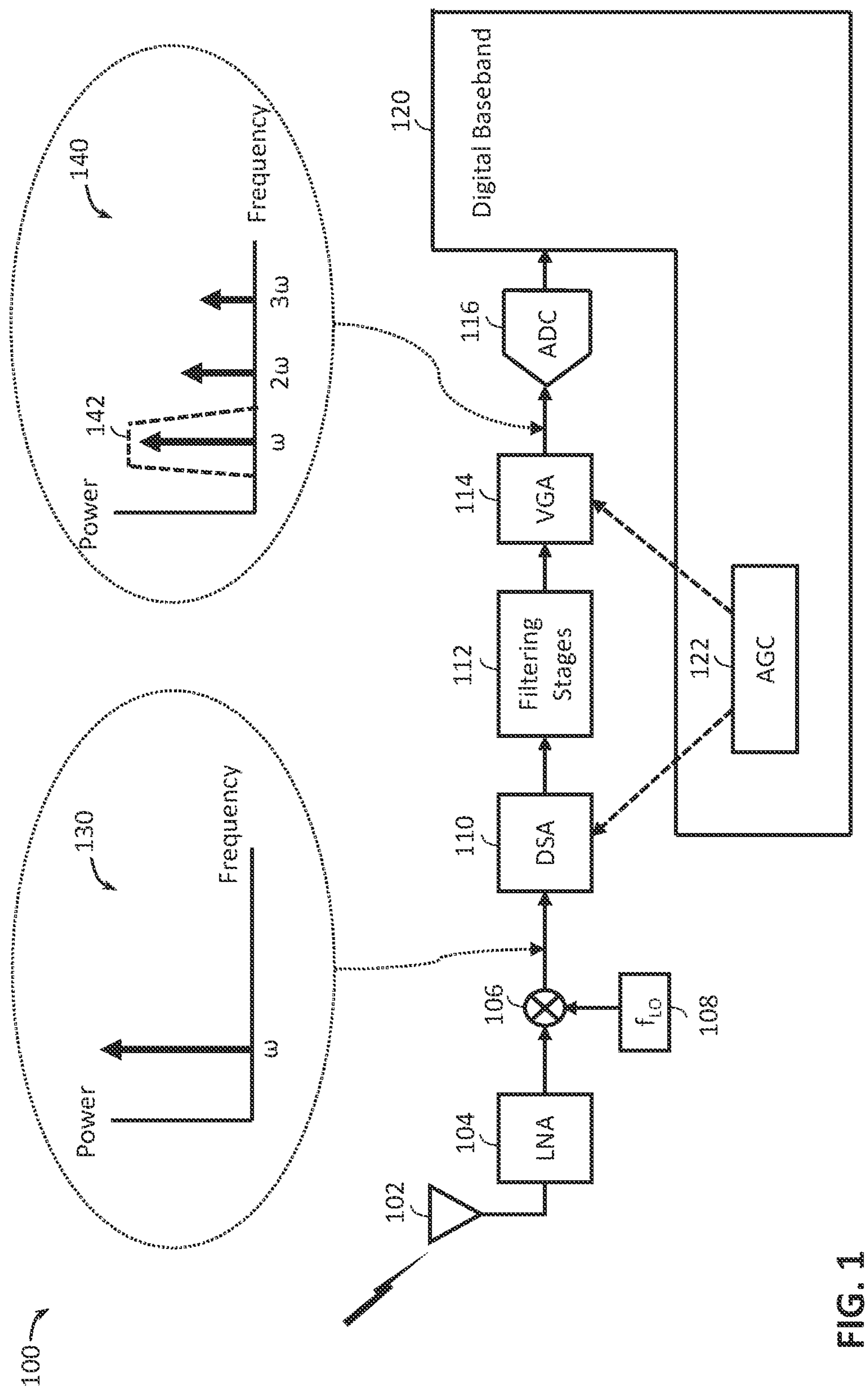
FIG. 1 is a schematic block diagram illustrating an exemplary radio frequency (RF) receive signal chain.

The systems, methods and devices of this disclosure each have several innovative embodiments, no single one of which is solely responsible for all of the desirable attributes disclosed herein. Details of one or more implementations of the subject matter described in this specification are set forth in the description below and the accompanying drawings.

For purposes of illustrating techniques for implementing receive chain linearization via time-interleaved and polyphase mixing of interleaved paths, it may be useful to understand phenomena that may come into play in such systems. The following foundational information may be viewed as a basis from which the present disclosure may be properly explained. Such information is offered for purposes of explanation only and, accordingly, should not be construed in any way to limit the broad scope of the present disclosure and its potential applications.

As described above, an RF receiver can suffer from linearity issue especially in the presence of in-band and/or adjacent channel jammers. A receive signal chain may include a contiguous chain of functional blocks, including but not limited to, a low-noise amplifier (LNA), mixer(s), amplifier circuitries (e.g., transimpedance amplifier (TIA)), filtering circuitries (e.g., anti-aliasing filter), variable gain and/or attenuation circuitries, and an analog-to-digital converter (ADC). For instance, the LNA may be coupled to a receive antenna and receive an RF signal from a certain frequency channel. The mixer(s) can down-convert the received RF signal into a baseband signal. The amplifier circuitries, filtering circuitries, and/or variable gain and/or attenuation circuitries can condition the received signal so that the received signal may be suitable for analog-to-digital conversion by the ADC and subsequent baseband processing. However, in some instances, the TIA and/or the filtering circuitries can generate high-order signal components (e.g., nonlinearity). As an example, a signal received at the input of the received signal chain may have a single frequency tone at w. However, because of the nonlinearity in the receive signal chain, the conditioned signal at later stage of the receive signal chain (e.g., at the input to the ADC) may include the wanted signal at w (a fundamental signal component) and a multitude of unwanted harmonics (e.g., at 2ω, 3ω, 4ω, 5ω, etc.). In some instances, the nonlinear or high-order signal component(s) can be located within a reception signal band (e.g., a signal band of interest) of the receiver, and thus may interfere with the receiver's reception. In other instances, the nonlinear high-order signal component(s) may be located outside of the signal band of interest, but may fall within an adjacent channel or frequency band in which another receiver may be operating in, and thus may interfere with the other receiver. In yet other instances, nonlinearity or high-order components generated by another receiver operating in an adjacent channel can also cause interference to the receiver in the frequency band of interest. In general, the nonlinearity of an RF receiver can cause in-band interference (to itself) and/or adjacent band interference (to other receivers) and/or experience interference caused by nonlinear receiver(s) operating in an adjacent channel. Accordingly, it may be desirable to reduce the nonlinearity in a receive signal chain.

Some approaches may reduce interference (due to nonlinearity) at a receive signal chain of a transceiver device at the expense of using a higher power and/or a larger die area. In one approach, a receiver may apply N different phase-shifts to a received signal, where the phase-shifts may be configured according to the harmonic(s) of interest for rejection. For example, N may be 3 for third-order intermodulation cancellation. The receiver may include N number of receive signal paths, for example, each including nonlinear components such as TIA(s) and/or filter(s), etc., to process an associated one of the N phase-shifted signals. The processed signal from each of the N receive signal paths may be further phase-shifted by a phase in opposition to a corresponding phase-shift applied at the beginning of the receive signal paths. After the further phase-shifting, the processed signals may be combined to provide harmonic rejection prior to analog-to-digital conversion. Utilizing multiple receive signal paths can increase area and power consumption. Further, this multi-path receiver approach may be sensitive to mismatch (e.g., components mismatch) among the multiple paths. Accordingly, such a receiver architecture may not be desirable. Some other approaches may utilize complex adaptive digital signal processing techniques to mask out the interferer. However, it may also be undesirable due to design complexity and potential area, power, and/or cost increase.

The present disclosure describes mechanisms for providing efficient high-linearity receivers via time-interleaved and polyphase mixing of interleaved paths. In one aspect, an apparatus may include a receive signal chain including an input node to receive an input signal (e.g., an RF signal). In some instances, the apparatus may be an RF receiver and the input node may correspond to output terminal(s) of receive antenna(s). The receive signal chain may further include a signal path coupled to the input node. The signal path may include signal conditioning circuitry, for example, including at least one nonlinear component (e.g., digital step attenuator (DSA), TIA, filter, etc.). To provide linearization to the receive signal chain, the apparatus may further include analog linearization circuitry coupled to the signal path. To that end, the analog linearization circuitry may include a plurality of polyphase mixer circuitry coupled to the input node. The plurality of polyphase mixer circuitry may include a set of first mixers and first local oscillators (LOs). The first LOs may be configured with a frequency corresponding to a downconversion frequency of interest (e.g., an intermediate frequency or a baseband frequency) and different phases associated with the nonlinearity of interest for the cancellation. For instance, the first LOs can generate a plurality of first LO signals each having a different phase associated with a nonlinearity of interest, and the first mixers can generate a plurality of phase-shifted downconverted signals from the received RF signal.

According to embodiments of the present disclosure, the phase-shifted downconverted signals can be processed by the signal conditioning circuitry in a time-interleaved manner. That is, the phase-shifted downconverted signals can be time-multiplexed onto the single signal path for processing by the signal conditioning circuitry. For instance, the analog linearization circuitry may further include a first multiplexer. The first multiplexer may have inputs coupled to outputs of the first mixers of the polyphase mixer circuitry. The first multiplexer may have an output coupled a first node (e.g., a node N1) on the signal path, where the first node is upstream of the at least one nonlinear circuitry. The first multiplexer may selectively couple one of the first LOs and an associated one of the first mixers to the signal path during each time slot of a plurality of time slots. In other words, the first multiplexer can select one of the phase-shifted, downconverted signals in each time slot for signal conditioning, for example, in a round-robin fashion.

In some embodiments, the analog linearization circuitry may include further polyphase mixer circuitry (e.g., second polyphase mixer circuitry) coupled between a second node (e.g., a node N2) and a third node (e.g., a node N3) on the signal path, where the second node and the third node may be downstream of the signal conditioning circuitry. The further polyphase mixer circuitry may include second LOs, a second multiplexer, and a second mixer. The second LOs may generate second LO signals each having a phase opposite to a phase of an associated one of the first LOs. The second multiplexer may have inputs coupled to the second LOs. The second mixer may have inputs coupled to an output of the second multiplexer and the second node on the signal path. The second mixer may have an output coupled to the third node on the signal path. The second multiplexer may selectively couple one of the second LOs to the second mixer in each of the plurality of time slots. In other words, the second multiplexer may select one of the second LO signals in each time slot for mixing with a respective one of the conditioned output by the signal conditioning circuitry. The second mixer may generate a phase-shifted conditioned signal in each time slot.

The multiplexing by the first multiplexer and the second multiplexer may be performed in coordination according to a path/phase select signal or simply a select signal. For instance, the analog linearization circuitry may further include path selection circuitry to generate a select signal in each of the plurality of time slots. During each time slot, the first multiplexer may selectively couple one of the first LOs and an associated one of the first mixers to the signal path according to the select signal, and the second multiplexer may selectively couple one of the second LOs to the second mixer according to the select signal.

The receive signal chain may further include an ADC arranged downstream of the signal conditioning circuitry. In some embodiments, the signal path may further include summing circuitry coupled to the output of the second mixer (before the ADC). The summing circuitry may include a demultiplexer and a plurality of capacitors connected in parallel. The input of the demultiplexer may be coupled to the third node on the signal path. The plurality of capacitors may be arranged between an output of the demultiplexer and a fourth node (e.g., a node N4) on the signal path. Each of the plurality of capacitors may be associated with one of the second LOs. The phase-shifted conditioned signals generated by the second mixer can be sampled onto corresponding capacitors and combined or summed at the fourth node by shorting the plurality of capacitors at the fourth node. The combined signal can effectively provide nonlinearity cancellation as will be described in detail below. The combined signal (e.g., the linearized signal) can be provided to the ADC for analog-to-digital conversion and for further processing by a digital baseband.

In some embodiments, the receive signal chain may not include specific summing circuitry for combining the phase-shifted conditioned signals generated by the second mixer. Instead, the combining can be performed as part of sampling operations at the ADC. To that end, the receive signal chain may terminate at a successive approximation register (SAR) ADC. The SAR ADC may include a capacitive digital-to-analog converter (CAPDAC). The CAPDAC may be configured with multiple sets of capacitors and a plurality of switches to selectively sample each of the phase-shifted conditioned signals onto one set of the multiple sets of capacitors. After sampling, the phase-shifted conditioned signals output by the second mixer during the different time slots may be combined, for example, at the top plates of the multiple sets of capacitors when sampling is performed at the bottom plates of the capacitors. In other instances, the receive signal chain may terminate at a pipelined ADC. The pipelined ADC may include at least two ADC stages and residual amplifier circuitry coupled between the two ADC stages. The residual amplifier circuitry may include an amplifier and one or more feedback capacitors. The residual amplifier circuitry may act as a summer to combine the phase-shifted conditioned signals output by the second mixer during the different time slots. For instance, the phase-shifted conditioned signals can be integrated onto the feedback capacitors of the residual amplifier circuitry.

The systems, schemes, and mechanisms described herein advantageously cancel nonlinearity in a receive signal chain by arranging the plurality of polyphase mixer circuitry upstream of a nonlinear circuit and arranging further polyphase mixer circuitry (with phase-shifts opposite to the phase-shifts of the plurality of polyphase mixer circuitry) downstream of the nonlinear circuit. Applying time-interleaving to condition the phase-shifted downconverted signals (output by the plurality of polyphase mixer circuitry), for example, in a round-robin manner, allows the receive signal chain to utilize a single signal path for signal conditioning instead of utilizing multiple parallel signal paths to condition each of the phase-shifted downconverted signals at the same time. Accordingly, the time-interleaved and polyphase mixing-based technique disclosed in the present disclosure for receive chain linearization can avoid increasing power and/or die area of a RF device significantly. Further, by combining of phase-shifted conditioned signals (output by the second mixer) as part of sampling operations at a SAR ADC or at a pipelined ADC can further eliminate the need for utilizing a separate summing circuitry, and thus may reduce design complexity, power, and/or die area.

Example RF Receive Chain

FIG. 1 is a schematic block diagram illustrating an exemplary RF receive signal chain 100. The RF receive signal chain 100 may be part of receiver circuitry (or, simply, a "receiver") in a RF transceiver device. In some instances, the RF transceiver device may be an integrated circuit (IC) device. As shown, the RF receive signal chain 100 may include, but not limited to, one or more antennas 102, an LNA 104, a mixer 106, a LO 108, a DSA 110, one or more filtering stages 112, a variable gain amplifier (VGA) 114, an ADC 116, and a digital baseband 120. The LNA 104, the mixer 106, a LO 108, the DSA 110, the one or more filtering stages 112, the VGA 114, and the ADC 116 may include components and/or circuitries that process analog signals. In some instances, the circuitries (e.g., LNA 104, the mixer 106, a LO 108, the DSA 110, the one or more filtering stages 112, and the VGA 114) from the input of antenna 102 up to the input to the ADC 116 may be referred to as an analog frontend. The LNA 104, the mixer 106, a LO 108, the DSA 110, the one or more filtering stages 112, and the VGA 114 may be arranged in the order as shown in FIG. 1 or in a different order. In general, the DSA 110, the one or more filtering stages 112, and the VGA 114 may be arranged in any suitable order. For example, in some instances, the receive signal chain 100 may include filtering stage(s) before the DSA 110 and/or additional filtering stage(s) after the VGA 114. In some instances, the DSA 110, the one or more filtering stages 112, and the VGA 114 may be referred to as signal conditioning circuitry.

The one or more antennas 102 may receive a wireless RF signal (shown by the lightning bolt) in a frequency band of operation. The frequency band may be within any suitable frequency range (e.g., MHz, sub-6 GHz, millimeter wave (mmWav) frequency range). In some instances, the antennas 102 may be an array of antenna elements, for example, arranged in columns and rows, capable of beamforming. The LNA 104 may be coupled to the antenna(s) 102. The LNA 104 may be an amplifier with a low noise figure (NF). The LNA 104 may amplify the received RF signal in the analog domain so that the amplified signal can stay above the noise floor of succeeding stages in the receive signal chain 100. The mixer 106 may be configured to perform analog downconversion of the received RF signal, for example, by mixing the received RF signal with an LO signal generated by the LO 108. As an example, the LO 108 may generate a LO signal at a frequency represented by fro. In some instances, the mixer 106 may downconvert the received RF signal to an intermediate frequency (IF) signal. In some instances, the mixer 106 may downconvert the received RF signal into a baseband signal. In general, the receive signal chain 100 may include any suitable number of analog downconversion stages (with mixers such as the mixers 106 and LOs such as the LOs 108) arranged in a cascaded configuration.

The DSA 110 may be coupled to the mixer 106 and may be configured to attenuate the downconverted signal output by the mixer 106. The DSA 110 may be programmed for various attenuation steps, for example, by the digital baseband 120. The one or more filtering stages 112 can condition the received signal. In some instances, the one or more filtering stages 112 may include a bandpass filter to remove components outside the signal band of interest, adjacent channel rejection filter to attenuate components in adjacent channels, and/or an anti-aliasing filter to restrict the bandwidth of the received signal to satisfy the Nyquist frequency. In general, the one or more filtering stages 112 may include any suitable filtering characteristics for signal conditioning. The VGA 114 may be coupled to the one or more filtering stages 112 and may be configured to adjust the gain or the dynamic range of the conditioned signal prior to analog-to-digital conversion by the ADC 116. The VGA 114 may include one more gain blocks that can be programmed by the digital baseband 120. The ADC 116 may be any suitable types of ADC for analog-to-digital conversion. Some examples of ADC may include, but not limited to, SAR ADC, pipelined ADC, etc.

In some embodiments, the digital baseband 120 may include an automatic gain control (AGC) block 122 configured to adjust or program the DSA 110 and/or the VGA 114 (as shown by the dashed arrows) such that the input signal to the ADC may have a suitable dynamic range for analog-to-digital conversion. To that end, the AGC block 122 may receive a digital signal from the ADC 116, determine a dynamic range or peak average ratio (PAR) of the received signal, and determine a suitable attenuation for configuring DSA 110 and/or a suitable gain for configuring the VGA 114. While not shown, the digital baseband 120 may include other signal processing blocks, for example, including but not limited to a demodulator, a noise estimator, a data de-interleaver, a descrambler, and/or a data decoder for recovering the original data information transmitted by a corresponding transmitter.

As explained above, a receive signal chain can include nonlinear characteristics. In the illustrated example of FIG. 1, the receive signal chain 100 may include nonlinear component(s) in the DSA 110 and/or the filtering stages 112. For example, in some instances, the filtering stages 112 may include a TIA, which may be nonlinear. Accordingly, the input signal at the ADC 116 can include nonlinearity. As an example, the downconverted signal output by the mixer 106 may have a tone or fundamental component represented by ω as shown by 130. Because of the nonlinear component in the DSA 110 and/or the filtering stages 112, the conditioned signal at the input of the ADC 116 may include the wanted signal at ω (a fundamental signal component) and unwanted high-order signal components or harmonics (e.g., at 2ω, 3ω, etc.) as shown by 140. While a band pass filter (shown by 142) can be used to filter out the high-order signal components outside of the signal band of interest, third-order and/or fifth-order inter-modulation products can be folded back into the signal band of interest and interfere with the reception at the receive signal chain 100. Further, while the high-order signal components may be outside of the signal band of interest, the high-order signal components may be within adjacent channels in which other receivers may perform receptions. As such, the nonlinearity caused by the receive signal chain 100 can impact its own receiver performance as well as the performance of other receiver(s) operating in the adjacent frequency band(s).

Example Time-Interleaved Polyphase Linearized RF Receive Signal Chain

Figure 2:
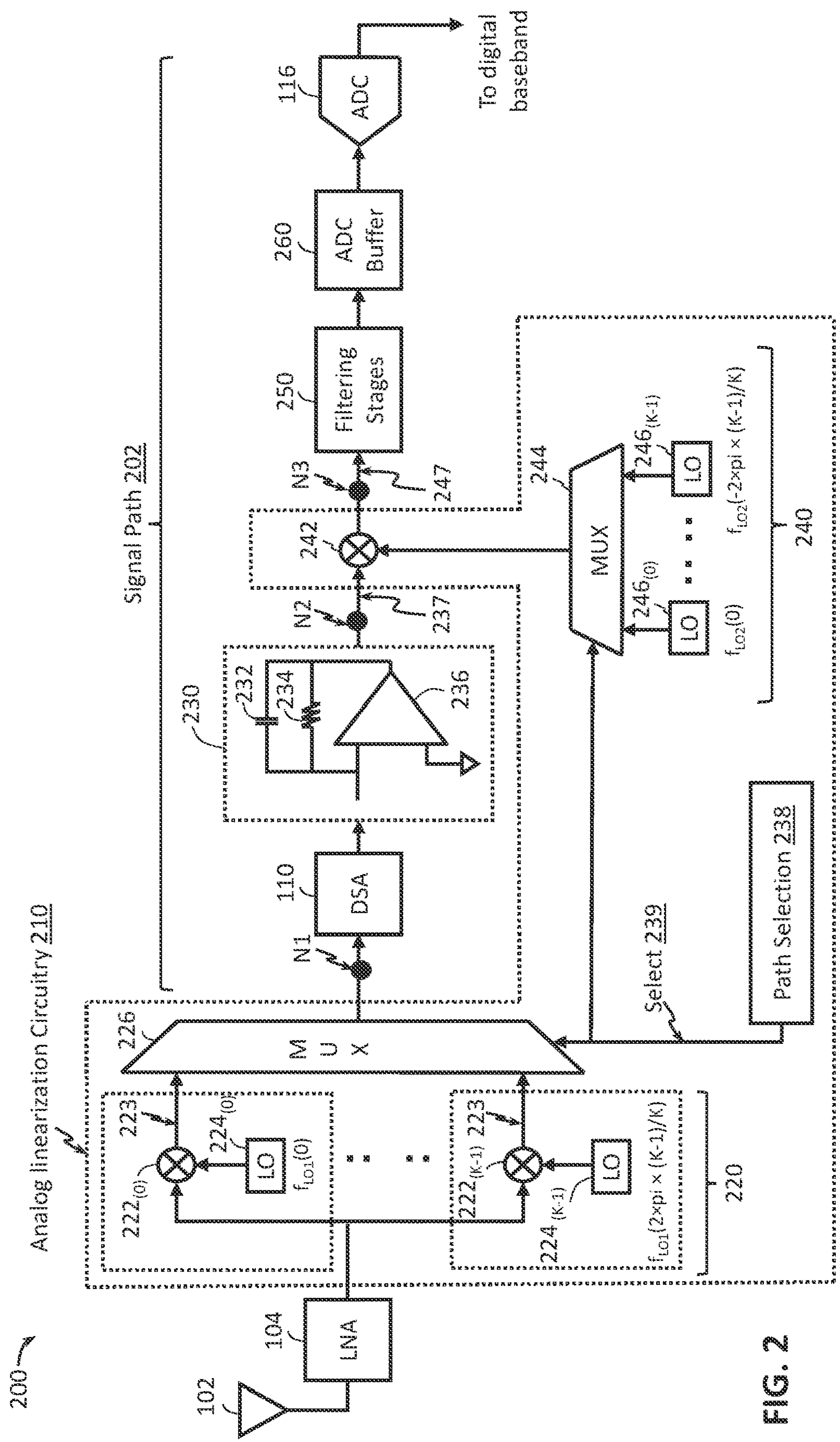
FIG. 2 is a schematic block diagram illustrating an exemplary time-interleaved polyphase linearized RF receive signal chain, according to some embodiments of the disclosure.

FIG. 2 is a schematic block diagram illustrating an exemplary time-interleaved polyphase linearized RF receive signal chain 200, according to some embodiments of the disclosure. The RF receive signal chain 200 may be part of receiver circuitry in a RF transceiver device. In some instances, the RF transceiver device may be an IC device. The receive signal chain 200 of FIG. 2 shares many elements with the receive signal chain 100 of FIG. 1; for brevity, a discussion of these elements is not repeated, and these elements may take the form of any of the embodiments disclosed herein.

As shown in FIG. 2, the receive signal chain 200 may include, but not limited to, one or more antennas 102, an LNA 104, a signal path 202, and an analog linearization circuitry 210. The signal path 202 may be coupled to an input node (e.g., at the output of the antenna 102) of the receive signal chain 200. The signal path 202 may include a DSA 110, a TIA and filtering stage 230, one or more additional filtering stages 250, an ADC buffer 260, and an ADC 116.

The TIA and filtering stage 230 may be coupled to the output of the DSA 110 and may be substantially similar to the filtering stages 112 of FIG. 1. For instance, the TIA and filtering stage 230 may provide bandpass filtering, adjacent channel rejection, and/or anti-aliasing filtering. As shown, the TIA and filtering stage 230 may include an operational amplifier 236, a feedback capacitor 232 and a feedback resistor 234. The feedback capacitor 232 and the feedback resistor 234 are connected in parallel between one input (e.g., an inverting input) of the operational amplifier 236 and an output of the operational amplifier 236. The other input (e.g., a non-inverting input) of the operational amplifier 236 may be connected to a reference potential such as a ground potential (as shown by the inverted triangle symbol). The feedback capacitor 232 and the feedback resistor 234 may be selected to have a certain capacitance and a certain resistance, respectively, to provide certain filtering characteristics. The operational amplifier 236 may operate as a TIA, for example, to convert an input current source to an output voltage. For instance, the one or more antennas 102 may receive the wireless RF signals by intercepting the power of a radio wave in space and produce current at the output terminals of the one or more antennas 102. In some instances, the TIA and filtering stage 230 may also provide VGA functionalities similar to the VGA 114 of FIG. 1. While the TIA and filtering stage 230 is illustrated with one amplifying stage (e.g., the operational amplifier 236, the feedback capacitor 232, and the feedback resistor 234), the TIA and filtering stage 230 can include two or more amplifying stages. The additional filtering stages 250 may provide further filtering operations, for example, to provide further adjacent channel filtering rejection. The ADC buffer 260 may buffer signals ready for analog-to-digital conversion by the ADC 116. In some embodiments, the additional filtering stages 250 and/or the ADC buffer 260 can be omitted.

At a high level, to linearize the receive signal chain 200, the highest nonlinear block(s) in the receive signal chain 200 may be identified. After identifying the highest nonlinear block(s), a first set of K phase-shifts may be applied to a signal before (upstream of) an earliest block of the highest nonlinear block(s), and a second set of K equal, but opposite phase-shifts (or substantially equal and opposite phase-shifts) may be applied to a signal after (downstream of) a last block of the highest nonlinearity block(s). If the $i^{th}$ phase shift in the first set of K phase-shifts is $(i-1)\times Ø$, where Ø is a phase-shift satisfying $K\times Ø=360°$, the circuit may produce the wanted harmonics and cancel the unwanted harmonics as will be discussed more fully below with reference to FIG. 3. To reduce power and/or die area, the phase-shifted signals after the first set of phase-shifts may be processed by the highest nonlinear block(s) in a time-interleaved manner (e.g., using time division multiplexing (TDM)) and the second set of phase-shifts may also be applied after the highest nonlinear block(s) in a time-interleaved manner as will be discussed more fully below.

As an example, the DSA 110 and/or the TIA and filtering stage 230 may have the highest nonlinearity in the receive signal path 202. Accordingly, a first set of K phase-shifts may be applied to a signal before the DSA 110 (the earliest block of the high-nonlinearity blocks along the signal path 202), for example, at the output of the LNA 104; and a second set of K equal, opposite phase-shifts may be applied to a signal after the TIA and filtering stage 230 (the last block of the high-nonlinearity blocks along the signal path 202), for example, at node N2 on the signal path 202.

As shown in FIG. 2, the analog linearization circuitry 210 may include a plurality of polyphase mixer circuitries 220, a multiplexer (MUX) 226, and further polyphase mixer circuitry 240. Each polyphase mixer circuitry 220 may include a pair of mixer $\mathbf{222}_{(i)}$ and an associated LO $\mathbf{224}_{(i)}$, where i may vary from 0 to K−1 for K number of phase-shifts. In FIG. 2, the mixers 222 are shown as $\mathbf{222}_{(0)}$ to $\mathbf{222}_{(K-1)}$ and the LOs 224 are shown as $\mathbf{224}_{(0)}$ to $\mathbf{224}_{(K-1)}$. The mixers 222 and the LOs 224 may provide the first set of phase-shifts along with downconversion before the DSA 110 (the earliest block of the highest nonlinear blocks). The polyphase mixer circuitry 240 may include LOs 246 (shown as $\mathbf{246}_{(0)}$ to $\mathbf{246}_{(K-1)}$), a multiplexer (MUX) 244, and a mixer 242. The mixer 242 and the LOs 246 may provide the second set of equal, opposite phase-shifts along with downconversion after the TIA and filtering stage 230 (the latest block of the highest nonlinear blocks). The multiplexer 226 and the multiplexer 244 may facilitate the time-interleaving operations before and after the highest nonlinear blocks, respectively.

To provide the first phase-shifts and downconversion, the LOs 224 may be configured to generate LO signals at the same frequency, which may be represented by $f_{LO1}$, but with different phases. The frequency $f_{LO1}$ may be configured according to a desirable downconversion frequency (e.g., an intermediate frequency (IF) or a baseband frequency). The different phases may be configured in any suitable manner. In some instances, the different phases may be equally spaced on a unit circle, for example, in increment of 2×pi/K radians. For instance, a LO $\mathbf{224}_{(0)}$ may generate a LO signal with a frequency of $f_{LO1}$ and a phase of 0 radian, a LO $\mathbf{224}_{(1)}$ (not shown) may generate a LO signal with a frequency of $f_{LO1}$ and a phase of 2×pi/K radian, . . . , and a LO $\mathbf{224}_{(K-1)}$ may generate a LO signal with a frequency of $f_{LO1}$ and a phase of 2×pi×(K−1)/K radian. At each polyphase mixer circuitry 220, the mixer 222 may mix a signal output by the LNA 104 with a LO signal provided by the associated LO 224 to generate a phase-shifted downconverted signal 223. The mixers 222 may also be referred to as polyphase mixers. As shown, the plurality of polyphase mixer circuitries 220 are arranged in a parallel configuration and may each process an output signal of the LNA 104 to generate a phase-shifted downconverted signal 223 at the same time.

The multiplexer 226 may include inputs coupled to the outputs of the mixers 222. The multiplexer 226 may further include an output coupled to a first node (shown as node N1) upstream of the DSA 110 and/or the TIA and filtering stage 230 (the highest nonlinear blocks). The multiplexer 226 may include switching elements to switch one of a plurality of input signal lines to a single output signal line. To provide time-interleaving, the multiplexer 226 may selectively couple one of the mixers 222 output to the signal path 202 during each time slot of a plurality of time slots or time-interleaving slots (e.g., the time slots 392 of FIG. 3). In other words, during each time slot, the multiplexer 226 may select one of the phase-shifted downconverted signals 223 for processing by subsequent circuitries or blocks in the signal path 202. To that end, the switching elements at the multiplexer 226 may be controlled by a set of selects signals 239, which may be referred to as path/phase select signals. The number of select signals 239 may correspond to the number of inputs at the multiplexer 226. In an embodiment, the analog linearization circuitry 210 may further include path selection circuitry 238 to generate the select signals 239, for example, to cause the switching elements at the multiplexer 226 to select the outputs of the mixers 222 in a round-robin fashion. That is, the multiplexer 226 may select the mixer $\mathbf{222}_{(0)}$ output, mixer $\mathbf{222}_{(1)}$ output, . . . , and the mixer $\mathbf{222}_{(K-1)}$ output sequentially (e.g., in order) and repeat the selection in the same order periodically as will be discussed more fully with reference to FIG. 3. In some instances, the interleaving frequency may be dependent on the number of polyphase mixers 222 and the selection frequency at the multiplexer 226 (e.g., how often the select signals 239 may change). In general, the interleaving frequency may be any suitable frequency and can be decoupled from the downconversion frequency. However, in some instances, it may be desirable to configure the interleaving frequency to be a prime multiple of the LOs 224' frequency $f_{LO1}$, and the select path frequency can be m/n times the LOs 224' frequency $f_{LO1}$, where m and n may be integers and m may be a prime number.

As further shown, the polyphase mixer circuitry 240 may be coupled between a second node (shown as node N2) and a third node (shown as node N3) on the signal path 202. At the polyphase mixer circuitry 240, the LOs 246 are configured to generate LO signals at the same frequency, which may be represented by $f_{LO2}$, but with different phases. More specifically, the LOs 246 may generate LO signals with phases that are equal, but opposite to the phases of the LOs 224 to facilitate cancellation of nonlinearity at the receive signal chain 200. For instance, a LO $\mathbf{246}_{(0)}$ may generate a LO signal with a frequency of $f_{LO2}$ and a phase of 0 radian, a LO $\mathbf{246}_{(1)}$ (not shown) may generate a LO signal with a frequency of $f_{LO2}$ and a phase of −(2×pi/K) radians, . . . , and a LO $\mathbf{246}_{(K-1)}$ may generate a LO signal with a frequency of $f_{LO2}$ and a phase of −(2×pi×(K−1)/K) radians. The frequency $f_{LO2}$ may be any suitable frequency. In some instances, the frequency $f_{LO1}$ may provide downconversion from an RF to an intermediate frequency (IF), and the frequency $f_{LO2}$ may provide downconversion from the IF to a baseband. As an example, the received RF signal may be at 10 GHz, the IF may be at 5 GHz, and the baseband may be at 0 Hz.

The multiplexer 244 may have inputs coupled to the LOs 224. The multiplexer 244 may be substantially similar to the multiplexer 226. To provide time-interleaving, the multiplexer 244 may selectively couple one of the LOs 246 to the mixer 242 during each time slot according to the select signals 239. The select signals 239 may synchronize a selection from the first set of phase-shifts (from the plurality of polyphase mixer circuitries 220) and a selection from the second set of phase-shifts (from the polyphase mixer circuitry 240) in each time slot. That is, when a certain phase-shift is applied before the DSA 110 and/or the TIA and filtering stage 230, an equal opposite phase-shift may be applied after the DSA 110 and/or the TIA and filtering stage 230. For instance, the select signals 239 may include a first set of control signals coupled to the multiplexer 226 (to control the switching elements at the multiplexer 226) and a second set of control signals coupled to the multiplexer 244 (to control the switching elements at the multiplexer 244). Each of the first set of control signals and the second set of control signals may include K number of control signals. Each control signal in the first set may control a switching element (e.g., open or close) at the multiplexer 226 to select a corresponding mixer 222's output. For instance, a switching element may be closed when a corresponding control signal is at a logic high, and may be opened when the corresponding control signal is at a logic low, or vice versa. In a similar way, each control signal in the second set may control a switching element (e.g., open or close) at the multiplexer 244 to select a corresponding LO 246. As an example, if the first set of control signals cause the multiplexer 226 to select the output of the mixer $\mathbf{222}_{(0)}$, the second set of control signals may correspondingly cause the multiplexer 244 to select the LO $\mathbf{246}_{(0)}$. As another example, if the first set of control signals causes the multiplexer 226 to select the output of the mixer $\mathbf{222}_{(K-1)}$, the second set of control signals may correspondingly cause the multiplexer 244 to select the LO $\mathbf{246}_{(K-1)}$.

The mixer 242 may include one input coupled to the output of the multiplexer 244 and another input coupled to the second node (the node N2) on the signal path 202. The mixer 242 may further include an output coupled to the third node (the node N3) on the signal path 202. During each time slot or time-interleaving slot, the mixer 242 may generate a phase-shifted conditioned signal 247 (at node N3) by mixing a signal (a conditioned signal 237 at node N2) output by the TIA and filtering stage 230 with the LO signal generated by the selected LO 246. The phase-shifted conditioned signal 247 generated in each time slot may be combined to provide a linearized signal (with nonlinearity cancelled or at least reduced in amplitudes) for subsequent processing by downstream circuitries. The combining may be achieved by sampling each of the phase-shifted conditioned signals 247 onto capacitors and shorting the capacitors to a summing node. In some embodiments, the combining of the phase-shifted conditioned signals 247 may be performed by including summing circuitry before the ADC 116 as discussed below with reference to FIG. 4. In other embodiments, the combining of the phase-shifted conditioned signals 247 may be performed as part of sampling operations at the ADC 116 as discussed below with reference to FIGS. 5A-5C and 6A-6B.

While FIG. 2 illustrates the first set of phase-shifts before the DSA 110 (the earliest block of the highest nonlinear blocks) and the second set of phase-shifts after the TIA and/or filtering stage 230 (the latest block of the highest nonlinear blocks) implemented along with downconversions via polyphase mixer circuitries, aspects are not limited thereto. For instance, the receive signal chain 200 may utilize components or circuitries to implement the first phase-shifts alone without downconversion and the second phase-shifts alone without downconversion. Alternatively, one of the first phase-shifts or the second phase-shifts may be implemented along with downconversion, and the other one of the first phase-shifts or the second phase-shifts may be implemented without downconversion. Further, while FIG. 2 illustrates the receive signal chain 200 as a single-ended receive signal chain, similar time-interleaving polyphase linearization techniques may be applied to a differential receive signal chain as will be discussed more fully below with reference to FIGS. 5A-5C and 6.

Example Time-Interleaved Polyphase Linearization Scheme

Figure 3:
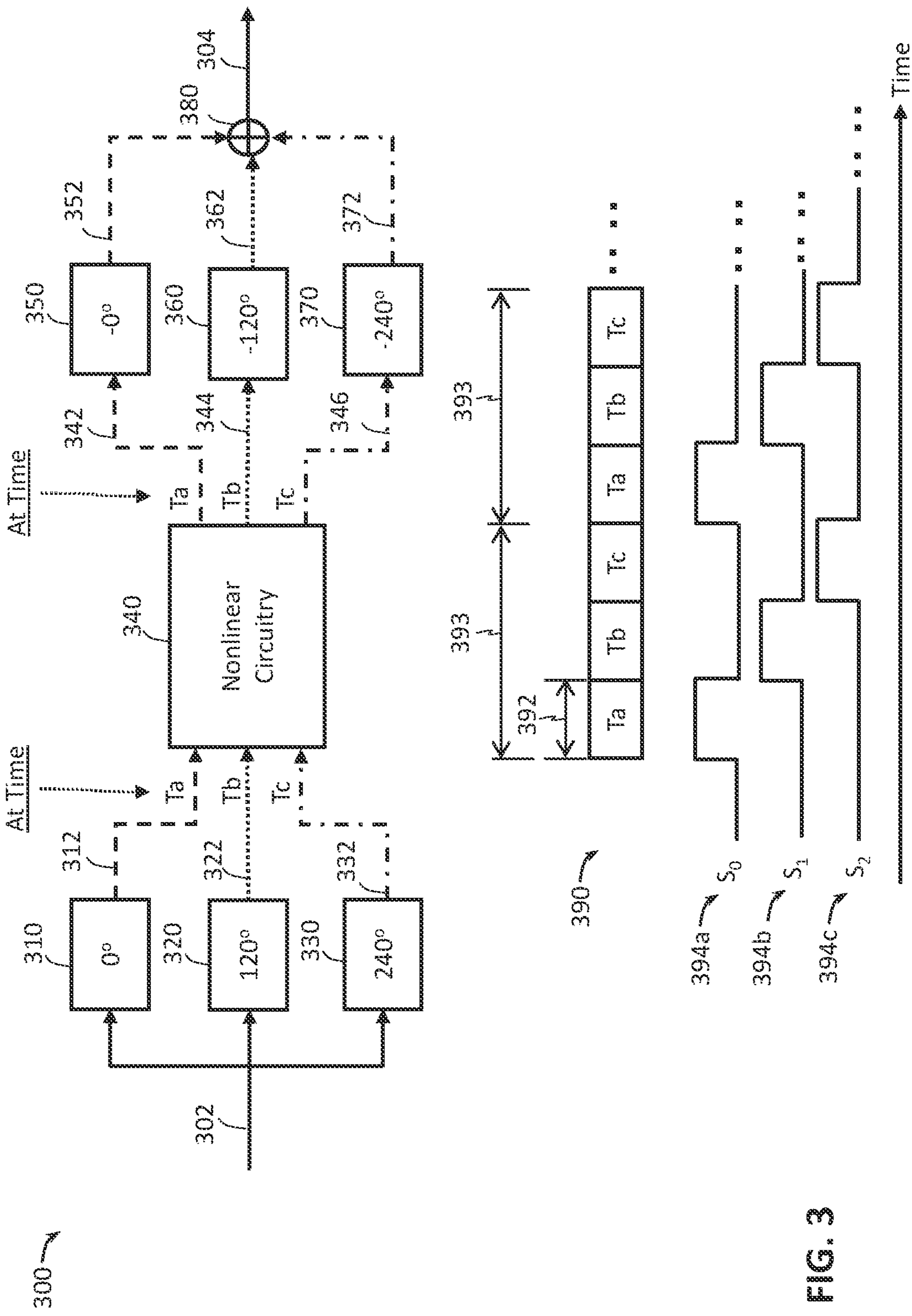
FIG. 3 illustrates an exemplary time-interleaved polyphase linearization scheme, according to some embodiments of the disclosure.

FIG. 3 illustrates an exemplary time-interleaved polyphase linearization scheme 300, according to some embodiments of the disclosure. The scheme 300 may be implemented by the receive signal chain 200 of FIG. 2. More specifically, the scheme 300 may be implemented by the analog linearization circuitry 210 in the receive signal chain 200. For simplicity of illustration and discussion, the scheme 300 is illustrated with a first set of three phase-shifts 310, 320, and 330 applied before nonlinear circuitry 340 and a second set of three corresponding equal, opposite phase-shifts 350, 360, and 370 applied after the nonlinear circuitry 340. However, the scheme 300 may be scaled to include any suitable number of phase-shifts (e.g., 4, 5, 6, 7, 8, 9 or more) in each of the first and second sets of phase-shifts. In an embodiment, the nonlinear circuitry 340 may correspond to the DSA 110 and/or the TIA and filtering stage 230 shown in FIG. 2, the first set of phase-shifts 310, 320, and 330 may be provided by the polyphase mixer circuitries 220 of FIG. 2, and the second set of phase-shifts 350, 360, and 370 may be provided by the polyphase mixer circuitry 240 of FIG. 2. That is, the phase-shifts 310, 320, and 330 and/or the second set of phase-shifts 350, 360, and 370 can be implemented in conjunction with downconversions as discussed above with reference to FIG. 2.

The scheme 300 may be configured to cancel or reduce nonlinearity (e.g., second harmonics, third harmonics, and/or third-order inter-modulation products) generated by the nonlinear circuitry 340. As shown, an analog signal 302 is to be processed by the nonlinear circuitry 340. The signal 302 may be phase-shifted concurrently by each of the phase-shifts 310, 320, and 330 with a phase-shift of 0°, 120°, and 240°, respectively, prior to processing by the nonlinear circuitry 340. The corresponding phase-shifted signals 312 (shown by the dashed line), 322 (shown by the dotted line), and 332 (shown by the dot-dashed line) may be processed by the nonlinear circuitry 340 in a time-interleaving manner as shown by the timeline 390. The timeline 390 is divided into a plurality of time slots 392. The time slots 392 may include groups of consecutive time slots 392 Ta, Tb, and Tc. Each group of consecutive time slots 392 may be referred to as a cycle 393 or interleaving cycle. The nonlinear circuitry 340 may process one of the signals 312, 322, and 332 in one time slot 392 within each cycle 393. In some instances, the signal 302 may correspond to the output signal of the LNA 104 and the signals 312, 322, and 332 may correspond to the phase-shifted downconverted signals 223 discussed above with reference to FIG. 2.

As an example, during a time slot 392 Ta, the nonlinear circuitry 340 may process the signal 312 (with a phase-shift of 0°) and output a signal 342, and the signal 342 may be phase-shifted by a corresponding phase-shift 350 (with a phase-shift of 0°) to generate a signal 352. Similarly, during a time slot 392 Tb, the nonlinear circuitry 340 may process the signal 322 (with a phase-shift of 120°) and output a signal 344, and the signal 344 may be phase-shifted by a corresponding equal, opposite phase-shift 360 (of −120°) to generate a signal 362. During a time slot 392 Tc, the nonlinear circuitry 340 may process the signal 332 (with a phase-shift of 240°) and output a signal 346, and the signal 346 may be phase-shifted by a corresponding equal, opposite phase-shift 370 (of −240°) to generate a signal 372. Stated differently, the signals 312, 322, and 332 may be time-multiplexed into a first time-multiplexed signal according to the slots 392 Ta, Tb, and Tc, the nonlinear circuitry 340 may process the first time-multiplexed signal to provide a second time-multiplexed signal including the signals 342, 344, and 346 according to the slots 392 Ta, Tb, and Tc, and the signals 352, 362, and 372 are time-multiplexed according to the slots 392 Ta, Tb, and Tc to provide a third time-multiplexed signal. In some instances, the signals 342, 344, and 346 may correspond to the conditioned signals 237 at node N2, and the signals 352, 362, and 372 may correspond to the phase-shifted conditioned signals 247 at node N3 discussed above with reference to FIG. 2.

The selection of the signals 312, 322, or 332 before the nonlinear circuitry 340 and the selection of the signals 342, 344, or 346 after the nonlinear circuitry 340 for time-interleaving may be based on a set of select signals 394*a* (shown as $S_0$), 394*b* (shown as $S_1$), and 394*c* (shown as $S_2$). For instance, when the select signal 394*a* is a logic high, the signal 312 may be selected before the nonlinear circuitry 340 and the signal 342 may be selected after the nonlinear circuitry 340. In a similar way, when the select signal 394*b* is a logic high, the signal 322 may be selected before the nonlinear circuitry 340 and the signal 344 may be selected after the nonlinear circuitry 340, and so on. In some instances, the select signals 394*a*, 394*b*, and 394*c* may correspond to the select signals 239 of FIG. 2. For example, the first set of control signals for controlling the multiplexing at the multiplexer 226 may be configured as shown by the select signals 394*a*, 394*b*, and 394*c*. Similarly, the second set of control signals for controlling the multiplexing at the multiplexer 244 may also be configured as shown by the select signals 394*a*, 394*b*, and 394*c*.

The signals 352, 362, and 372 may be combined by the summer 380 to provide a combined signal 304. Due to the nonlinearity of the nonlinear circuitry 340, the phase rotation for the $k^{th}$ harmonic is k times the input phase, so the fundamental component in the signals 352, 362, and 372 may have phase-shifts of [0°, 120°, 240°], the second harmonic in the signals 352, 362, and 372 may have phase-shifts of [0°, 240°, 120°], and the third harmonic in the signals 352, 362, and 372 may have phase-shifts of [0°, 0°, 0°], respectively. As can be seen, the fundamental component may add up in phase, while the second and third harmonics may result in a zero sum when the signals 352, 362, and 372 are combined. Consequently, second and third harmonics can be cancelled. Depending on the implementations, in some instances, the cancellation may not be perfect, but the second and third harmonics at the combined signal 304 may at least be attenuated in amplitudes.

The summing operations performed by the summer 380 may be implemented in a variety of ways. In one embodiment, the summer 380 may be implemented via specific summing circuitry before the ADC 116 as discussed below with reference to FIG. 4. In other embodiments, the summer 380 may be implemented as part of sampling operations at the ADC 116 as discussed below with reference to FIGS. 5A-5C and 6.

Example Summing Circuitry for Time-Interleaved Polyphase Linearization

Figure 4:
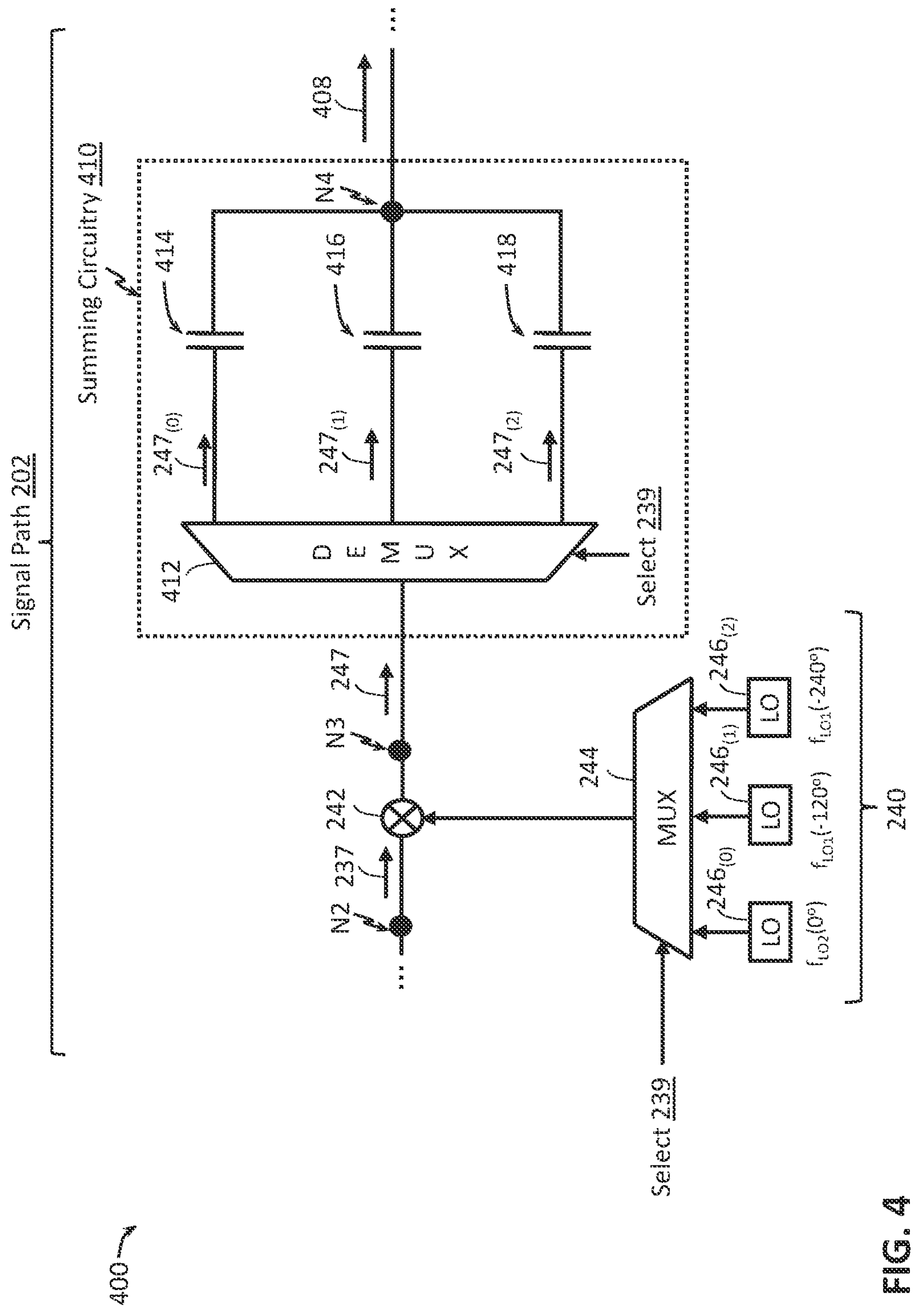
FIG. 4 is a schematic diagram illustrating a portion of an exemplary time-interleaved polyphase linearized RF receive signal chain with summing circuitry, according to some embodiments of the disclosure.

FIG. 4 is discussed in relation to FIGS. 2 and 3. FIG. 4 is a schematic diagram illustrating a portion of an exemplary time-interleaved polyphase linearized RF receive signal chain 400 with summing circuitry 410, according to some embodiments of the disclosure. The RF receive signal chain 400 may be part of receiver circuitry in a RF transceiver device. In some instances, the RF transceiver device may be an IC device. The portion of the receive signal chain 400 of FIG. 4 shares many elements with the receive signal chain 200 of FIG. 2; for brevity, a discussion of these elements is not repeated, and these elements may take the form of any of the embodiments disclosed herein. For simplicity, FIG. 4 illustrates the portion of the receive signal chain 400 that is downstream of nonlinear circuitry (e.g., highest nonlinear blocks of interest for linearization) in the receive signal chain 400. The nonlinear circuitry may be similar to the DSA 110 and the TIA and filtering stage 230 of FIG. 2 or the nonlinear circuitry 340 of FIG. 3. The receive signal chain 400 may include other circuitries such as polyphase mixer circuitries similar to the polyphase mixer circuitries 220 and the multiplexer 226 as discussed above with reference to FIG. 2 or phase-shifts 310, 320, 330 as discussed above with reference to FIG. 3 arranged upstream of the nonlinear circuitry.

As shown in FIG. 4, the summing circuitry 410 may be coupled to the output of the mixer 242 (of the polyphase mixer circuitry 240), for example, at node N3 on the signal path 202. For simplicity, the summing circuitry 410 is illustrated for combining three phase-shifted conditioned signal 247 (shown as $\mathbf{247}_{(0)}$, $\mathbf{247}_{(1)}$, and $\mathbf{247}_{(2)}$). However, the summing circuitry 410 may be scaled to combine any suitable number of phase-shifted conditioned signals 247 (e.g., 2, 4, 5, 6, 7, 8 or more). For instance, the receive signal path 202 may include circuitry (e.g., the polyphase mixer circuitries 220 and the multiplexer 226 or the phase-shifts 310, 320, and 330) providing phase-shifts of 0°, 120°, and 240° upstream of the nonlinear circuitry in the receive signal chain 400 and the polyphase mixer circuitry 240 providing corresponding phase-shifts of 0°, −120°, and −240° downstream of the nonlinear circuitry similar to FIG. 3. The polyphase mixer circuitry 240 may include three LOs $\mathbf{246}_{(0)}$, $\mathbf{246}_{(1)}$, and $\mathbf{246}_{(2)}$ providing corresponding equal, opposite phase-shifts of 0°, −120°, and −240°, respectively. For example, the mixer 242 may output the phase-shifted conditioned signals $\mathbf{247}_{(0)}$, $\mathbf{247}_{(1)}$, and $\mathbf{247}_{(2)}$ when LOs $\mathbf{246}_{(0)}$, $\mathbf{246}_{(1)}$, and $\mathbf{246}_{(2)}$, respectively, are selected.

As further shown in FIG. 4, the summing circuitry 410 may include a demultiplexer 412 and capacitors 414, 416, and 418. The demultiplexer 412 may include switching elements to switch one common input line to one of several output lines. For instance, the demultiplexer 412 may have an input coupled to the node N3 and multiple outputs each couplable to one of the capacitors 414, 416, and 418. The capacitors 414, 416, and 418 may be arranged in a parallel configuration coupled between the outputs of the demultiplexer 412 and a fourth node (shown as node N4) on the signal path. Each of the capacitors 414, 416, and 418 may be associated with one of the LOs 246. For instance, the capacitors 414, 416, and 418 may be associated with the LOs $\mathbf{246}_{(0)}$, $\mathbf{246}_{(1)}$, and $\mathbf{246}_{(2)}$, respectively.

Each of the capacitors 414, 416, and 418 may be used to sample phase-shifted conditioned signal 247 from a different phase-shift. As used herein, sampling a signal onto a capacitor may refer to charging the capacitor by the signal (e.g., a voltage signal). For instance, the capacitor 414 may be used for sampling phase-shifted signals $\mathbf{247}_{(0)}$ (from phase-shift of 0°) the capacitor 416 may be used for sampling phase-shifted signals $\mathbf{247}_{(1)}$ (from phase-shift of −120°), and the capacitor 418 may be used for sampling phase-shifted signals $\mathbf{247}_{(2)}$ (from phase-shift of −270°). To that end, the demultiplexer 412 may selectively switch a phase-shifted conditioned signal 247 to one of its outputs so that the phase-shifted conditioned signal 247 can be sampled onto one of the capacitors 414, 416, or 418. The demultiplexer 412 may perform the selective switching based on the select signals 239.

As discussed above, the path selection circuitry 238 of FIG. 2 may generate select signals 239 including a first set of control signals for controlling switching elements at multiplexer 226 and a second set of control signals for controlling switching elements at the multiplexer 244. To facilitate the demultiplexing, the select signals 239 may further include a third set of control signals for controlling switching elements at the demultiplexer 412 in synchronization with the first and second set of control signals.

As an example, if the first set of control signals cause the multiplexer 226 to select a phase-shifted down-converted signal with a phase-shift of 0°, the second set of control signals may correspondingly cause the multiplexer 244 to select the LO $\mathbf{246}_{(0)}$ (to provide a phases-shift of 0°), and the third set of control signals may correspondingly cause the demultiplexer 412 to output the phase-shifted conditioned signal $\mathbf{247}_{(0)}$ for sampling on the capacitor 414 (e.g., during a time slot 392 Ta of FIG. 3). If the first set of control signals cause the multiplexer 226 to select a phase-shifted down-converted signal with a phase-shift of 120°, the second set of control signals may correspondingly cause the multiplexer 244 to select the LO $\mathbf{246}_{(1)}$ (to provide a phases-shift of −120°), and the third set of control signals may correspondingly cause the demultiplexer 412 to output the phase-shifted conditioned signal $\mathbf{247}_{(1)}$ for sampling on the capacitor 416 (e.g., during a time slot 392 Tb of FIG. 3). If the first set of control signals cause the multiplexer 226 to select a phase-shifted down-converted signal with a phase-shift of 240°, the second set of control signals may correspondingly cause the multiplexer 244 to select the LO $\mathbf{246}_{(2)}$ (to provide a phases-shift of −240°), and the third set of control signals may correspondingly cause the demultiplexer 412 to output the phase-shifted conditioned signal $\mathbf{247}_{(2)}$ for sampling on the capacitor 418 (e.g., during a time slot 392 Tc of FIG. 3). Stated differently, each of the capacitors 414, 416, and 418 may be charged by a corresponding phase-shifted conditioned signals $\mathbf{247}_{(0)}$, $\mathbf{247}_{(1)}$, and $\mathbf{247}_{(2)}$, respectively, where the phase-shifted conditioned signals $\mathbf{247}_{(0)}$, $\mathbf{247}_{(1)}$, and $\mathbf{247}_{(2)}$ are voltage signals. At the end of an interleaving cycle, the phase-shifted conditioned signals 247 associated with the different phase-shifts may be integrated or combined by shorting the capacitors 414, 416, and 418 to the node N4 (a summing node) to provide a combined signal 408. The shorting of the capacitors 414, 416, and 418 may cause the charges on the capacitors 414, 416, and 418 to be summed. In some instances, the phase-shifted conditioned signals $\mathbf{247}_{(0)}$, $\mathbf{247}_{(1)}$, and $\mathbf{247}_{(2)}$ may correspond to the signals 352, 362, and 372, respectively, and the combined signal 408 may correspond to the combined signal 304 as discussed above with reference to FIG. 3.

While FIG. 4 illustrates that each of the phase-shifted conditioned signals $\mathbf{247}_{(0)}$, $\mathbf{247}_{(1)}$, and $\mathbf{247}_{(2)}$ is sampled onto one capacitor in each time slot, aspects are not limited thereto. For instance, the summing circuitry 410 can include an array of capacitors (e.g., 2, 3, 4 or more) connected in series in place of each of the capacitors 414, 416, and 418 and each of the phase-shifted conditioned signals $\mathbf{247}_{(0)}$, $\mathbf{247}_{(1)}$, and $\mathbf{247}_{(2)}$ can be sampled onto an array of capacitors. The summing circuitry 410 can also include other circuit elements to facilitate the combining of the phase-shifted conditioned signals $\mathbf{247}_{(0)}$, $\mathbf{247}_{(1)}$, and $\mathbf{247}_{(2)}$ in each interleaving cycle. Further, in some instances, the summing circuitry 410 can be implemented as part of a subsequent filtering stage and/or buffering stage (e.g., the additional filtering stages 250 and/or ADC buffer 260) in the receive signal chain 400 before sampling by an ADC (e.g., the ADC 116).

Example Time-Interleaved Polyphase Linearization Scheme with SAR ADC

Figure 5A:
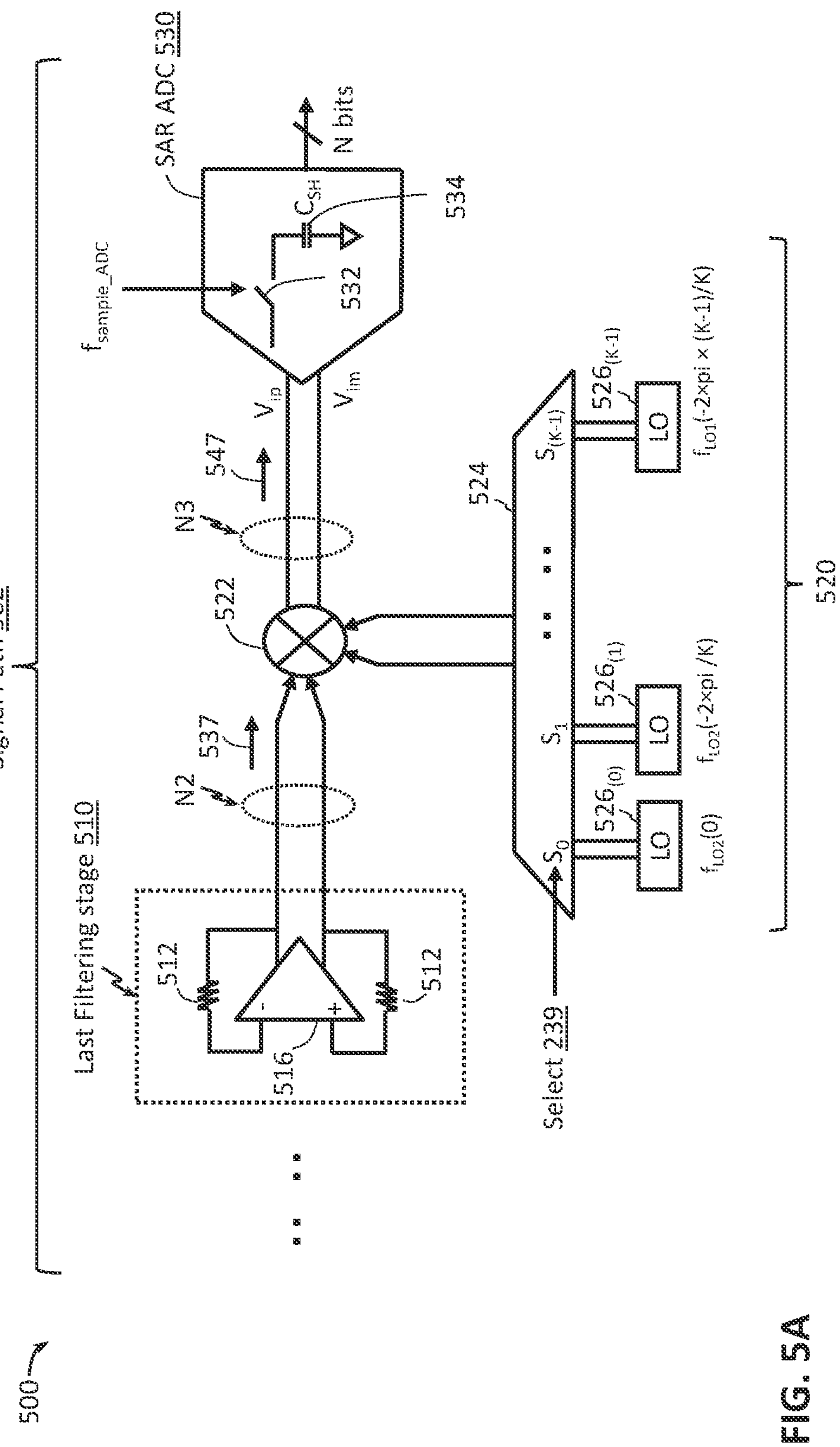
FIG. 5A is a schematic diagram illustrating a portion of an exemplary time-interleaved polyphase linearized RF receive signal chain with a successive approximation register (SAR) analog-to-digital converter (ADC), according to some embodiments of the disclosure.
Figure 5B:
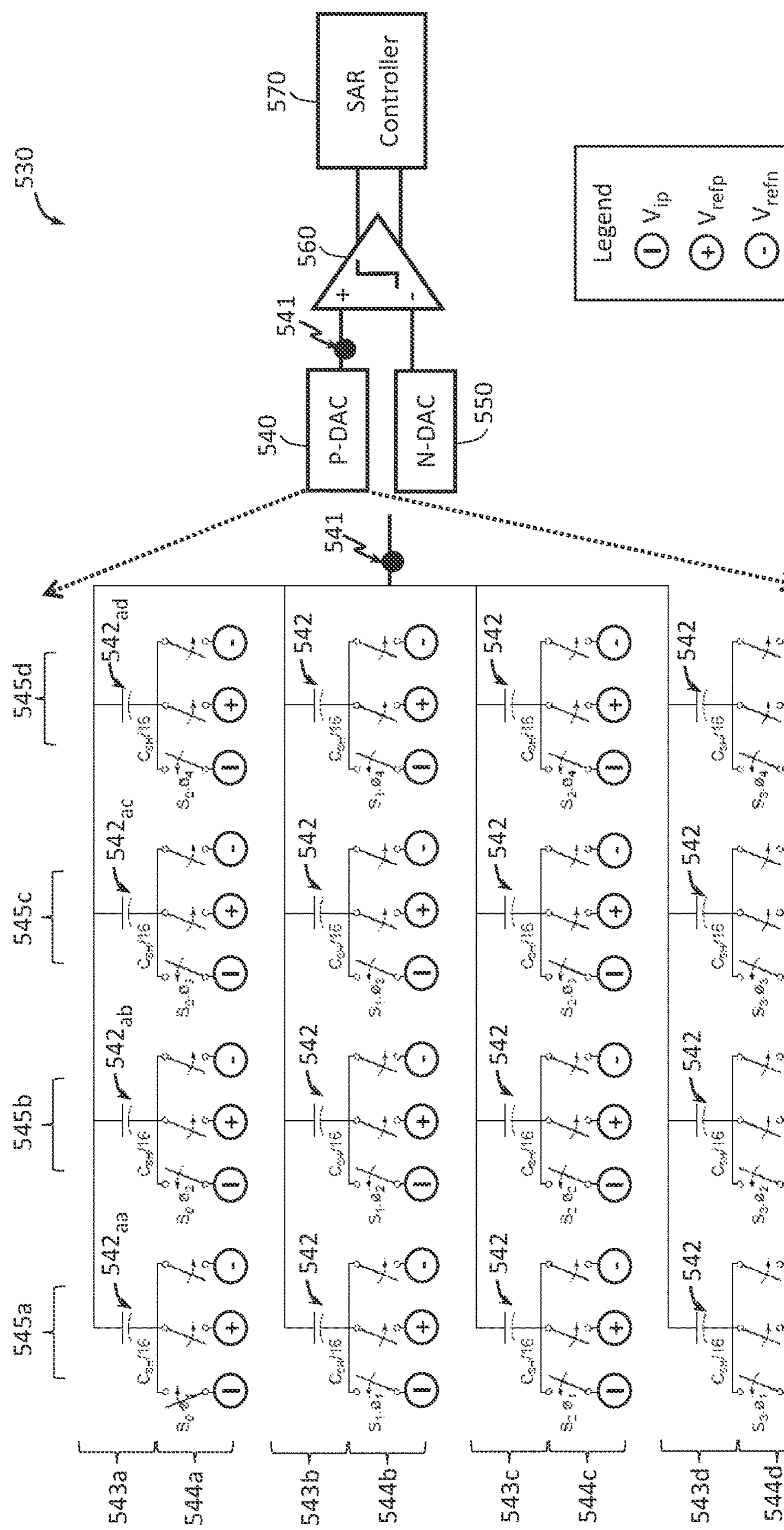
FIG. 5B is a schematic diagram illustrating an exemplary SAR ADC for use in a time-interleaved polyphase linearized RF receiver chain, according to some embodiments of the disclosure.
Figure 5C:
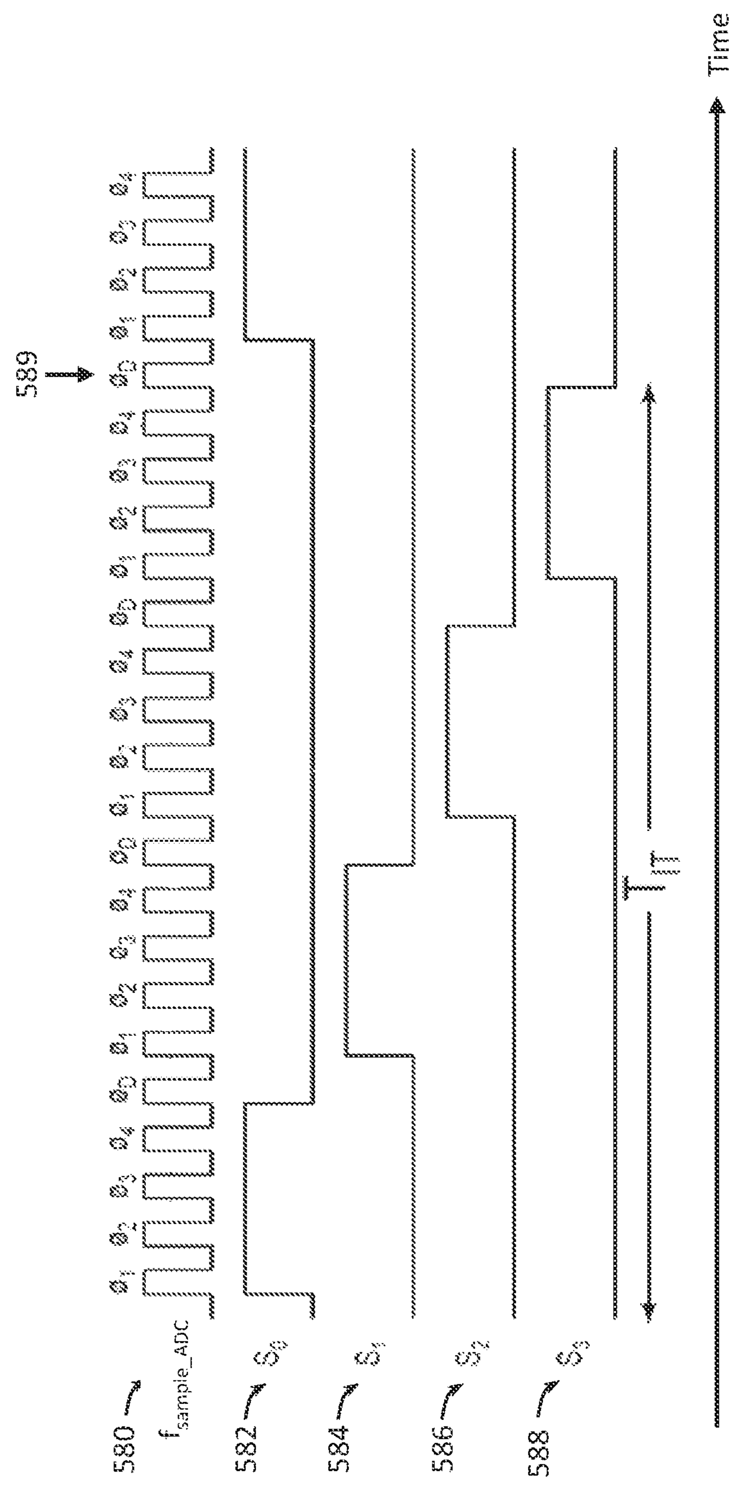
FIG. 5C is a timing diagram of control signals for operating a SAR ADC in a time-interleaved polyphase linearized RF receiver chain, according to some embodiments of the disclosure.

FIGS. 5A-5C are discussed in relation to each other to illustrate time-interleaved polyphase mixing-based linearization in a receive signal chain that combines phase-shifted conditioned signals (e.g., the phase-shifted conditioned signals 247) as part of sampling operations at a SAR ADC instead of utilizing specific summing circuitry 410 as discussed above with reference to FIG. 4. Further, FIGS. 5A-5C are discussed in relation to FIGS. 2 and 3.

FIG. 5A is a schematic diagram illustrating a portion of an exemplary time-interleaved polyphase linearized RF receive signal chain 500 with a SAR ADC 530, according to some embodiments of the disclosure. The RF receive signal chain 500 may be part of receiver circuitry in a RF transceiver device. In some instances, the RF transceiver device may be an IC device. The receive signal chain 500 of FIG. 5A may be substantially similar to the receive signal chain 200 of FIG. 2 and may perform substantially similar operations for linearization as the receive signal chain 200. However, the receive signal chain 500 is illustrated for a differential configuration instead of a single-ended configuration as in FIG. 2 and may utilize the SAR ADC 530 for analog-to-digital conversion. For simplicity, FIG. 5A illustrates the portion of the receive signal chain 500 from the last non-linear circuitry (e.g., the last filtering stage 510) of interest in the receive signal chain 500 until the SAR ADC 530. However, the receive signal chain 500 may include circuitries such as polyphase mixer circuitries similar to the polyphase mixer circuitries 220 and a multiplexer similar to the multiplexer 226 as discussed above with reference to FIG. 2 or phase-shifts 310, 320, 330 as discussed above with reference to FIG. 3 arranged upstream of an earliest non-linear stage (of interest for linearization) in the receive signal chain 500. For instance, the receive signal chain 500 may receive an input differential signal at a pair of input nodes, generate phase-shifted down-converted differential signals, and time-multiplex the phase-shifted down-converted differential signals (with different phase-shifts) at a pair of first nodes for processing by the nonlinear circuitry using substantially similar mechanisms as discussed above with reference to FIG. 2.

As shown in FIG. 5A, the receive signal chain 500 may include a differential signal path 502. The differential signal path 502 may include a first signal path (e.g., the upper path) and a second signal path (e.g., the lower path). The following discussions may refer to the first path as a positive signal path and the second path as a negative signal path. However, in other instances, the first path may be a negative signal path and the second path may be a positive signal path. The last filtering stage 510 may include a TIA 516 with a feedback resistor 512 coupled between an inverting input and an output of the TIA 516 and another feedback resistor 512 coupled between a non-inverting input and the output of the TIA 516. The last filtering stage 510 may also include other circuit components such as feedback capacitors, etc. The last filtering stage 510 may operate on an input differential signal and output a conditioned differential signal 537 at a pair of second nodes (shown as N2). The conditioned differential signal 537 may be substantially similar to the conditioned signal 237 discussed above with reference to FIGS. 2 and 4 and/or the signals 342, 342, and/or 346.

As further shown in FIG. 5A, the receive signal chain 500 may include polyphase mixer circuitry 520 coupled between the pair of second nodes N2 and a pair of third nodes (shown as N3) on the signal path 502. The polyphase mixer circuitry 520 may be substantially similar to the polyphase mixer circuitry 240 of FIG. 2. For instance, the polyphase mixer circuitry 520 may include K plurality of LOs 526 (shown as $\mathbf{526}_{(0)}$ to $\mathbf{526}_{(K-1)}$), a multiplexer (MUX) 524, and a mixer 522. The LOs 526, the multiplexer 524, and the mixer 522 may be substantially similar to the LOs 246, the multiplexer 244, and the mixer 242 of FIG. 2, respectively, but may be configured for differential signal operations instead of single-ended signal operations. For instance, the LOs 526 are configured to generate LO signals (differential signals) at the same frequency $f_{LO2}$, but with different phases, for example, with equal and opposite to the phases of the LOs in the polyphase mixer circuitry upstream of the earliest nonlinear stage in the receive signal chain 500. The multiplexer 524 may include switching elements that can be controlled to selectively couple one of the LOs 526 to the mixer 522 according to the select signals 239.

As shown, a LO $\mathbf{526}_{(0)}$ may generate a LO signal with a frequency of $f_{LO2}$ and a phase of 0 radian, a LO $\mathbf{526}_{(1)}$ may generate a LO signal with a frequency of $f_{LO2}$ and a phase of −(2×pi/K) radians, . . . , and a LO $\mathbf{526}_{(K-1)}$ may generate a LO signal with a frequency of $f_{LO2}$ and a phase of −(2×pi×(K−1)/K) radians. As similarly discussed above, the select signals 239 may include a first set of control signals for the multiplexer selection at the polyphase mixer circuitry upstream of the earliest nonlinear stage and a second set of control signals for the selection at the multiplexer 524. For instance, if the first set of control signals cause the polyphase mixer circuitry upstream of the earliest nonlinear stage to output a phase-shifted signal with a phase-shift of (2×pi×i/K) radians, the second set of control signals may correspondingly cause the multiplexer 524 to select the LO $\mathbf{246}_{(i)}$. In some embodiments, the second set of control signals may be shown as $S_0, S_1, \ldots, S_{(K-1)}$ and the multiplexer 524 may include switching elements that may selectively open or close to couple the LOs $\mathbf{526}_{(0)}, \mathbf{526}_{(1)}, \ldots, \mathbf{526}_{(K-1)}$, to the output of the multiplexer 524 according to the select signals $S_0, S_1, \ldots, S_{(K-1)}$, respectively.

The mixer 522 may include an input coupled to the output of the multiplexer 524, another input coupled to the pair of second nodes N2, and an output coupled to the pair of third nodes N3. The polyphase mixer circuitry upstream of the earliest nonlinear stage and the polyphase mixer circuitry 520 after the last nonlinear filtering stage 510 may perform time interleaving using substantially similar mechanisms as discussed above with reference to FIGS. 2 and 3. For instance, during each time slot, the mixer 522 may generate a phase-shifted conditioned signal 547 (at nodes N3) by mixing an output signal (a conditioned signal 537 at nodes N2) of the last filtering 510 with the LO signal generated by the selected LO 526. The signals 537 and 547 may be substantially similar to the signals 237 and 247, respectively, but are differential signals instead of single-ended signals. That is, each of the signals 537 and 547 may include a positive signal component (e.g., a positive voltage component) and a negative signal component (e.g., a negative voltage component). In order not to clutter drawings provided in the FIG. 5A, reference numerals to the differential signals are shown only on one path (e.g., reference numeral 537 is only shown for the positive signal component on the positive signal path, but not for the negative signal component on the negative signal path, even though it refers to both).

The SAR ADC 530 is shown as a differential ADC receiving the positive signal component and the negative signal component of the phase-shifted conditioned signal 547 at nodes $V_{ip}$ and $V_{im}$, respectively. The SAR ADC 530 may convert the analog phase-shifted conditioned signal 547 to a digital signal. At a high level, each of the positive and negative signal components of the phase-shifted conditioned signal 547 (e.g., a continuous analog waveform signal) can be separately sampled onto a sample and hold capacitor 534 (e.g., with a capacitance of $C_{SH}$) according to a sampling switch 532, which may be driven by a sampling signal $f_{sample\_ADC}$. After sampling, the SAR ADC 530 may convert the sampled signal into a discrete digital representation using a binary search through all possible quantization levels before converging upon a digital output for each conversion.

FIGS. 5B and 5C together illustrate mechanisms for combining the phase-shifted conditioned signals 547 as part of sampling operations at the SAR ADC 530. For simplicity, FIGS. 5B and 5C are discussed assuming the receive signal chain 500 has four phase-shifts, for example, for cancelling second, third, and fourth harmonics generated by the nonlinear circuitry at the receive signal chain 500. In other words, K may be 4 with phase-shifts of 0° (0 radian), 90° (−(2×pi/4) radians), 180° (−(2×pi×2/4) radians), and 270° (−(2×pi×3/4) radian) applied before the nonlinear circuitry and phase-shifts of 0°, −90°, −180°, and −270° applied after the nonlinear circuitry to provide phase-shifted conditioned signals 547. For example, a phase-shifted conditioned signals $\mathbf{547}_{(0)}$ may be generated when a phase-shift of 0° is applied before the nonlinear circuitry, and a phase-shift of 0° is applied after the nonlinear circuitry (e.g., by closing a switch at the multiplexer 524 based on a select signal $S_0$). Similarly, a phase-shifted conditioned signals $\mathbf{547}_{(1)}$ may be generated when a phase-shift of 90° is applied before the nonlinear circuitry, and a phase-shift of −90° is applied after the nonlinear circuitry (e.g., by closing a switch at the multiplexer 524 based on a select signal $S_1$). A phase-shifted conditioned signals $\mathbf{547}_{(2)}$ may be generated when a phase-shift of 180° is applied before the nonlinear circuitry, and a phase-shift of −180° is applied after the nonlinear circuitry (e.g., by closing a switch at the multiplexer 524 based on a select signal $S_2$). A phase-shifted conditioned signals $\mathbf{547}_{(3)}$ may be generated when a phase-shift of 270° is applied before the nonlinear circuitry, and a phase-shift of −270° is applied after the nonlinear circuitry (e.g., by closing a switch at the multiplexer 524 based on a select signal $S_3$). In some instances, the phase-shifts before and/or after the nonlinear circuitry may be applied along with down-conversions using polyphase mixers as discussed above with reference to FIGS. 2, 3, and 4.

FIG. 5B is a schematic diagram illustrating an exemplary SAR ADC 530 for use in the time-interleaved polyphase linearized RF receiver chain 500, according to some embodiments of the disclosure. As shown, the SAR ADC 530 may include two CAPDACs, shown as P-DAC 540 and N-DAC 550, a comparator 560, and a SAR controller 570 to drive the P-DAC 540 and N-DAC 550. The P-DAC 540 and the N-DAC 550 may be coupled to the node $V_{ip}$ and node $V_{im}$, respectively, on the signal path 502 of FIG. 5A. The P-DAC 540 may receive and operate on the positive signal component of the phase-shifted conditioned signal 547, while the N-DAC 550 may receive and operate on the negative signal component of the phase-shifted conditioned signal 547. The output of the P-DAC 540 may be coupled to a non-inverting input of the comparator 560, and the output of the N-DAC 550 may be coupled to an inverting input of the comparator 560.

For simplicity or illustration and discussion, FIG. 5B illustrates an expanded view only for the internal circuitry of the P-DAC 540. However, the N-DAC 550 may have a substantially similar configuration as the P-DAC 540. As shown in the expanded view, the P-DAC 540 may include a plurality of capacitors 542 with a total capacitance corresponding to the capacitance (e.g., unit capacitance) of the sample and hold capacitor 534 shown in FIG. 5A. The plurality of capacitors 542 may include any suitable number of capacitors 542 (e.g., 4, 5, 6, 7, 8, 16, 24, 32, 64, etc.).

In the illustrated example of FIG. 5B, there are 16 capacitors 542 in the P-DAC 540. Each capacitor 542 may have a capacitance of $C_{SH}/16$ and may be referred to as a capacitor chunk and the P-DAC 540 may be referred to as a segmented CAPDAC. The capacitors 542 may be arranged into multiple parallel sets 543 (shown as 543*a*, 543*b*, 543*c*, and 543*d*) of capacitors 542. The number of sets 543 (e.g., number of rows) may be dependent on the number of phase-shifts used for linearization in the receive signal chain 500. Accordingly, FIG. 5B shows four sets 543*a*, 543*b*, 543*c*, and 543*d* of capacitors 542 based on the four phase-shifts used for the linearization. If, however, the receive signal chain 500 utilizes three phase-shifts of 0°, 120°, and 240° before the nonlinear circuitry and three phase-shifts of 0°, −120°, and −240° after the nonlinear circuitry, the P-DAC 540 may include 3 sets of capacitors 542. In general, the CAPDAC configuration shown in FIG. 5B may be scaled to any suitable number of sets or rows (e.g., 5, 6, 7, or more) of capacitors in accordance with the number of phase-shifts.

Further, each capacitor set 543 may be partitioned into multiple segments to facilitate partial sampling as discussed below with reference to FIG. 5C. In the example shown in FIG. 5B, each set 543 is partitioned into four segments 545*a*, 545*b*, 545*c*, and 545*d*. For example, the capacitor 542 within the set 543*a* and the segment 545*a* is shown as $\mathbf{542}_{aa}$, the capacitor 542 within the set 543*a* and the segment 545*b* is shown as $\mathbf{542}_{ab}$, the capacitor 542 within the set 543*a* and the segment 545*c* is shown as 542*ac*, the capacitor 542 within the set 543*a* and the segment 545*d* is shown as $\mathbf{542}_{ad}$. In order not to clutter drawings provided in FIG. 5B, the subscripts for the reference numerals for capacitors 542 in the sets 543*b*, 543*c*, and 543*d* are omitted. In general, a CAPDAC in a SAR ADC may be partitioned into $C_{SH}$/K equal portions for K phase-shifts, and each $C_{SH}$/K portion may be further partitioned into multiple segments. The number of segments may be based on a desirable partial sampling rate.

The P-DAC 540 may further include a set of switches 544 (shown as 544*a*, 544*b*, 544*c*, and 544*d*) coupled to each of the capacitor sets 543. Each set of switches 544 may include three switches 544 for each capacitor 542 in a corresponding set 543 to selectively connect the bottom plate of the capacitor 542 to the input node $V_{ip}$ (shown by the circle with the symbol "|"), a positive reference voltage rail $V_{refp}$ (shown by the circle with the symbol "+"), or a negative reference voltage rail $V_{refn}$ (shown by the circle with the symbol "−"). The switching (e.g., the close/open states of the switches 544) may be dependent on whether sampling or conversion is being performed and/or a comparison output of the comparator 560. The top plates of the capacitors 542 are connected to a common node 541, which is connected to the non-inverting input of the comparator 560. The SAR ADC 530 may further include a top plate switch (not shown) coupling the node 541 (the top plates of the capacitors 542) to a bias voltage (e.g., a common mode voltage for $V_{refp}$ and $V_{refn}$). In this disclosure, the terms "top plates" and "bottom plates" are used for convenience in describing the figures and are not meant to imply that there is any required spatial orientation for the capacitors 542. For instance, the top plates may be referred to as first plates and the bottom plates may be referred to as second plates.

FIG. 5C is a timing diagram of control signals for operating the SAR ADC 530 in the time-interleaved poly-phase linearized RF receiver chain 500, according to some embodiments of the disclosure. FIG. 5C illustrates a sampling signal 580 represented by $f_{sample\_ADC}$ and select signals 582, 584, 586, and 588 represented by $S_0$, $S_1$, $S_2$, and $S_3$, respectively for controlling sampling and conversion operations at the SAR ADC 530. As shown, the sampling signal 580 may include pulses or phases $\Phi_1$, $\Phi_2$, $\Phi_3$, $\Phi_4$, and $\Phi_D$ that are repeated periodically. The phases $\Phi_1$, $\Phi_2$, $\Phi_3$, and $\Phi_4$ may be used for sampling, and the phase $\Phi_D$ may be used for conversion. While FIG. 5C illustrates the sampling phases $\Phi_1$, $\Phi_2$, $\Phi_3$, $\Phi_4$, and the conversion phase $\Phi_D$ to have about the same duration, in some instances, each of the sampling phases $\Phi_1$, $\Phi_2$, $\Phi_3$, and $\Phi_4$ may have about the same pulse duration, while the conversion phase $\Phi_D$ may have a longer pulse duration. The phases $\Phi_1$, $\Phi_2$, $\Phi_3$, and $\Phi_4$ may control which of the capacitor segments 545 may be used for sampling, and the select signals 582, 584, 586, and 588 may control which of the capacitor sets 543 may be used for sampling.

As discussed above, when the receive signal chain 500 is configured with 4 phase-shifts (e.g., K=4), the receive signal chain 500 may generate phase-shifted conditioned signals $\mathbf{547}_{(0)}$, $\mathbf{547}_{(1)}$, $\mathbf{547}_{(2)}$, and $\mathbf{547}_{(3)}$ when the select signals 239 (the second set of control signals) $S_0$, $S_1$, $S_2$, and $S_3$ at the multiplexer 524 are selected, respectively. The select signals 582, 584, 586, and 588 may be synchronized to the select signals 239 $S_0$, $S_1$, $S_2$, and $S_3$, respectively. For instance, when the select signal 239 $S_0$ is selected to provide the phase-shifted conditioned signals $\mathbf{547}_{(0)}$, the select signal 582 may have a logic high. Similarly, when the select signal 239 $S_1$ is selected to provide the phase-shifted conditioned signals $\mathbf{547}_{(1)}$, the select signal 584 may have a logic high. When the select signal 239 $S_2$ is selected to provide the phase-shifted conditioned signals $\mathbf{547}_{(2)}$, the select signal 586 may have a logic high. When the select signal 239 $S_3$ is selected to provide the phase-shifted conditioned signals $\mathbf{547}_{(3)}$, the select signal 588 may have a logic high.

During each of the sampling phases $\Phi_1$, $\Phi_2$, $\Phi_3$, and $\Phi_4$, the P-DAC 540 may sample a corresponding phase-shifted conditioned signal 547 from the path selected or enabled by the select signals 239 $S_0$, $S_1$, $S_2$, and $S_3$, but with delays. For instance, when the select signal 582 $S_0$ is high (corresponding to a logic high at the select signal 239 $S_0$), the phase-shifted conditioned signal $\mathbf{547}_{(0)}$ may be sampled onto (charge) the capacitor $\mathbf{542}_{aa}$ within the set 543*a* and within the segment 545*a* during $\Phi_1$; the phase-shifted conditioned signal $\mathbf{547}_{(0)}$ may be sampled onto (charge) the capacitor $\mathbf{542}_{ab}$ within the set 543*b* and within the segment 545*b* during $\Phi_2$; the phase-shifted conditioned signal $\mathbf{547}_{(0)}$ may be sampled onto (charge) the capacitor $\mathbf{542}_{ac}$ within the set 543*c* and within the segment 545*c* during $\Phi_3$; and the phase-shifted conditioned signal $\mathbf{547}_{(0)}$ may be and sampled onto (charge) the capacitor $\mathbf{542}_{ad}$ within the set 543*d* and within the segment 545*d* during $\Phi_4$. During sampling, the top plate switch may be closed to couple the node 541 to the bias voltage, and corresponding switches 544 are closed to connect the bottom plates of corresponding capacitors $\mathbf{542}_{aa}$, $\mathbf{542}_{ab}$, $\mathbf{542}_{ac}$, and $\mathbf{542}_{ad}$ to the input node $V_{ip}$ according to the select signal 582 $S_0$ and the phases $\Phi_1$, $\Phi_1$, $\Phi_1$, and $\Phi_4$. For instance, a switch 544 controlled by the select signal 582 $S_0$ and $\Phi_1$ may be closed to connect the bottom plate of the capacitor $\mathbf{542}_{aa}$ to the input node $V_{ip}$ when both the select signal 582 $S_0$ and $\Phi_1$ are logic high. Similarly, a switch 544 controlled by the select signal 582 $S_0$ and $\Phi_2$ may be closed to connect the bottom plate of the capacitor $\mathbf{542}_{ab}$ to the input node $V_{ip}$ when both the select signal 582 $S_0$ and $\Phi_2$ are logic high, and so on.

The sampling may continue for the remaining phase-shifted conditioned signals $\mathbf{547}_{(1)}$, $\mathbf{547}_{(2)}$, and $\mathbf{547}_{(3)}$ in a similar way. For instance, when the select signal 584 $S_1$ is high (corresponding to the select signal 239 $S_1$ being selected), the phase-shifted conditioned signal $\mathbf{547}_{(1)}$ may be sampled onto corresponding capacitors 542 in the set 543*b* during corresponding sampling phases $\Phi_1$, $\Phi_2$, $\Phi_3$, and $\Phi_4$. When the select signal 586 $S_2$ is high, the phase-shifted conditioned signal $\mathbf{547}_{(2)}$ may be sampled onto corresponding capacitors 542 in the set 543*c* during corresponding sampling phases $\Phi_1$, $\Phi_2$, $\Phi_3$, and $\Phi_4$. When the select signal 588 $S_3$ is high, the phase-shifted conditioned signal $\mathbf{547}_{(3)}$ may be sampled onto corresponding capacitors 542 in the set 543*d* during corresponding sampling phases $\Phi_1$, $\Phi_2$, $\Phi_3$, and $\Phi_4$. At the end of the sampling (e.g., end of phase $\Phi_4$ after the last phase-shifted conditioned signals $\mathbf{547}_{(3)}$ is sampled) when the bottom plates of all the capacitors 542 are connected to a common mode voltage and the top plate switch is opened, the combining or addition of the phase-shifted conditioned signals $547_{(0)}$, $547_{(1)}$, $547_{(2)}$, and $547_{(3)}$ occurred at the top-plates of the capacitors 542, but with delays leading to partial sampling, and a digital code may be generated for the combined signals (e.g., the combined phase-shifted conditioned signals $547_{(0)}$, $547_{(1)}$, $547_{(2)}$, and $547_{(3)}$) during a following phase $\Phi_D$ (as shown by the arrow 589).

Phrased differently, when the select signal 582 $S_0$ is high, the phase-shifted conditioned signal $547_{(0)}$ (from the zero degree phase shifted path) is partially sampled onto the capacitors $542_{aa}$, $542_{ab}$, $542_{ac}$, and $542_{ad}$ in the first row (set 543*a*). This sampling event may repeat during the interval when the select signal 584 $S_1$ is high where the capacitors 542 in the second row (set 543*b*) are sampling the input in a partial manner. This sampling event may repeat again for the capacitors 542 in the third row (set 543*c*) during the interval when the select signal 586 $S_2$ is high, and so on. In the interval after the select signal 588 $S_3$ is high (e.g., after the negative edge of S3 or during the following phase $\Phi_D$ as shown by the arrow 589), the input is removed and the top plate is made floating (e.g., the top plate switch is opened) and this is when the addition of the sampled voltages from the different phase-shifted paths happens at the top plate of the P-DAC 540 where a digital code may be generated for the combined voltages. Accordingly, the sampling operations at the P-DAC 540 may include the combining of the phase-shifted conditioned signals $547_{(0)}$, $547_{(1)}$, $547_{(2)}$, and $547_{(3)}$, removing the need for specific summing circuitry such as the summing circuitry 410 of FIG. 4.

The N-DAC 550 may have capacitors and switches arranged in a similar configuration as the P-DAC 540, and the negative signal component of each of the phase-shifted conditioned signals may be sampled onto corresponding capacitors in the N-DAC 550 in a similar manner as the P-DAC 540. For conversion during the phase $\Phi_D$, the comparator 560 may output a +1 (e.g., representing a binary 1) or a −1 (e.g., representing a binary 0) at each of the inverting output and non-inverting output according to corresponding sampled voltage at the P-DAC 540 and at the N-DAC 550. The SAR controller 570 may include combinational logic configured to generate a digital output based on the outputs of the comparator 560, for example, using an iterative process. The SAR controller 570 may also control the switching at each set of the switches 544 (e.g., to connect the bottom plate of a respective capacitor 542 to $V_{refp}$ or $V_{refn}$) according to the outputs of the comparator 560. The sampling and conversions for the phase-shifted conditioned signals $547_{(0)}$, $547_{(1)}$, $547_{(2)}$, and $547_{(3)}$ may be repeated at every interleaving cycle (shown as $T_{IT}$).

In some embodiments, shuffling and/or dithering may be applied to the capacitors 542 ($C_{SH}$/16 chunks) to reduce the effects of mismatch among the capacitors 542. For instance, the SAR ADC 530 can include additional circuitry for shuffling the capacitors 542 from sampling an input corresponding to S0 and $\Phi_1$ in one phase to another phase such as S1 and $\Phi_2$. That is, a particular capacitor 542 can be used for sampling a phase-shifted conditioned signal $547_{(0)}$ associated with the 0° phase-shift during one time interval and for sampling a phase-shifted conditioned signal $547_{(1)}$ associated with the −90° phase-shift during another time interval instead of using the same capacitor 572 for sampling a phase-shifted conditioned signal $547_{(0)}$ with the same phase-shift of 0° every time. Accordingly, shuffling can break the correlation in the mismatch ("chunk" mismatch) among the capacitors 542 in the SAR ADC 530, and thus can lead to improvements in systematic integral nonlinearity (INL) and/or differential nonlinearity (DNL). Additionally or alternatively, the SAR ADC 530 can apply the dithering using a pseudorandom binary sequence (PRBS) and adding the PRBS sequence to the sampled input signal using additional capacitors (e.g., referred to as "dithering capacitors") connected to the same top plates as the rest of capacitors 542 ($C_{SH}$/16 chunks). For instance, the SAR ADC 530 may include additional circuitry to add different dither values (random values) to corresponding sampled voltages during different conversion phases $\Phi_D$ via the dithering capacitors.

In some embodiments, the partial sampling with the phases $\Phi_1$, $\Phi_2$, $\Phi_3$, and $\Phi_4$ can provide anti-aliasing filtering characteristics and/or finite impulse response (FIR) characteristics (e.g., with frequency notches provided by the sampling signal 580 where the notches may be at $f_{sample\_ADC}/4$ with the 4 sampling phases), and thus the receive signal chain 500 may utilize a more relaxed filtering stage (e.g., the stage 510) prior to the ADC 530. Utilizing a more relaxed filtering stage at the receive signal chain 500 can save power and/or die area. While FIGS. 5B and 5C are discussed using bottom plate sampling at the P-DAC 540 and the N-DAC 550, top plate sampling may be used instead to provide similar functionalities.

Example Time-Interleaved Polyphase Linearization Scheme with Pipelined ADC

Figure 6:
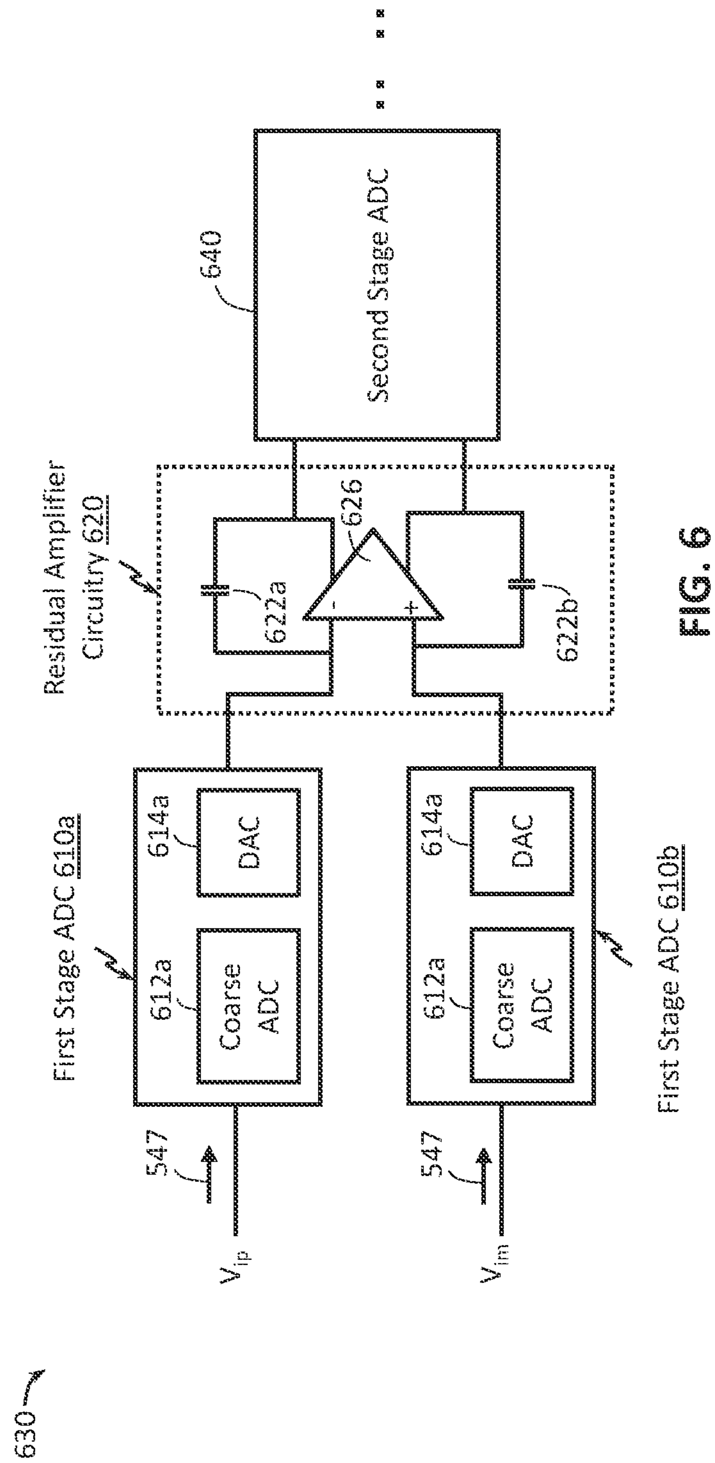
FIG. 6 is a schematic diagram illustrating an exemplary pipelined ADC for use in a time-interleaved polyphase linearized RF receiver chain, according to some embodiments of the disclosure.

FIG. 6 is a schematic diagram illustrating an exemplary pipelined ADC 630 for use in a time-interleaved polyphase linearized RF receiver chain, according to some embodiments of the disclosure. In an embodiment, the pipelined ADC 630 may be used in place of the SAR ADC 530 in the receive signal chain 500 of FIG. 5A. That is, the pipelined ADC 630 may receive the phase-shifted conditioned signals 547 and perform analog-to-digital conversion on the phase-shifted conditioned signals 547 (e.g., voltage signals). Additionally, the phase-shifted conditioned signals 547 from the different phase-shifts can be combined as part of sampling operations at the pipelined ADC 630.

At a high level, a pipelined ADC may include a series of pipeline stages (e.g., at least two stages) that are separated by sampling and hold circuits. An analog input signal at the inputs of the pipelined ADC is sampled and held while a first stage quantizes the sample into digital bits. The digitized sample is then fed into a DAC, and the resulting analog output is subtracted from the original sample. The residue thus obtained is then typically gained up by a desired gain factor, for example, using residual amplifier circuitry, and passed to a next similar stage. The process is repeated as the sample continues through additional stages of the pipeline. Since the bits from each stage are determined at different times, all of the bits corresponding to a given sample are corrected for time-alignment, typically using shift registers, prior to being output.

In the example illustrated in FIG. 6, the pipelined ADC 630 may include first stage ADCs 610 (shown as 610*a* and 610*b*) and a second stage ADC 640 interconnected by residual amplifier circuitry 620. The residual amplifier circuitry 620 may include an operational amplifier 626 with feedback capacitors 622*a* and 622*b*. The feedback capacitor 622*a* may be coupled between an inverting input and an output of the amplifier 626. The feedback capacitor 622*b* may be coupled between a non-inverting input and the output of the amplifier 626. The pipelined ADC 630 may include additional ADC stages, where the output of one ADC stage may be connected to a next ADC stage by residual amplifier circuitry similar to the residual amplifier circuitry 620. The first stage ADCs 610 may be single-ended (operating on single-ended signals) and subsequent ADC stages may be differential (operating on differential signals).

Each of the first stage ADC 610*a* and 610*b* may be coupled to the pair of nodes $V_{ip}$ and $V_{im}$ on the signal path 502 of FIG. 5A to receive a differential input signal 547. Further, each of the first stage ADC 610*a* and 610*b* may include a coarse ADC 612 and a DAC 614. More specifically, the first stage ADC 610*a* may be coupled to $V_{ip}$ and may include a coarse ADC 612*a* and a DAC 614*a*, and the first stage ADC 610*b* may be coupled to $V_{im}$ and may include a coarse ADC 612*b* and a DAC 614*b*. The coarse ADC 612*a* may receive the positive signal component of a phase-shifted conditioned signals 547, and the coarse ADC 612*b* may receive the negative signal component of the phase-shifted conditioned signals 547. The coarse ADCs 612*a* and 612*b* may determine information (e.g., input common-mode, overvoltage, speed tradeoffs for sampling and/or conversions, etc.) about corresponding positive and negative components of the phase-shifted conditioned signals 547, respectively.

Each of the DACs 614*a* and 614*b* may be a CAPDAC similar to the P-DAC 540 shown in FIG. 5B. For instance, each of the DACs 614*a* and 614*b* may include four parallel sets of capacitors (e.g., when using four phase-shifts for linearization) and associated switches arranged in a similar configuration as the capacitors 542 and associated switches 544. Each of the positive and negative signal components of the phase-shifted conditioned signal 547 may be sampled onto different sets of capacitors within corresponding DAC 614*a* and 614*b*, respectively, using similar mechanism as discussed above with reference to FIGS. 5B and 5C. For example, the positive signal component of a phase-shifted conditioned signal $\mathbf{547}_{(0)}$ (associated with a phase-shift of 0°), the positive signal component of a phase-shifted conditioned signal $\mathbf{547}_{(1)}$ (associated with a phase-shift of −90°), the positive signal component of a phase-shifted conditioned signal $\mathbf{547}_{(2)}$ (associated with a phase-shift of −180°), and the positive signal component of a phase-shifted conditioned signal $\mathbf{547}_{(3)}$ (associated with a phase-shift of −270°) may be sampled onto a first set of capacitors, a second set of capacitors, a third set of capacitors, and a fourth set of capacitors, respectively, within the DAC 614*a*.

Further, the sampling of the phase-shifted conditioned signal $\mathbf{547}_{(0)}$, $\mathbf{547}_{(1)}$, $\mathbf{547}_{(2)}$, and $\mathbf{547}_{(3)}$ onto the capacitors may be according to a sampling signal similar to the sampling signal 580 and select signals similar to the select signals 582, 584, 586, and 588. The charges on the first, second, third, and fourth set of capacitors of the DAC 614*a* may be transferred to the feedback capacitor 622*a* of the residual amplifier circuitry 620. In other words, the positive signal components of the phase-shifted conditioned signal $\mathbf{547}_{(0)}$, $\mathbf{547}_{(1)}$, $\mathbf{547}_{(2)}$, and $\mathbf{547}_{(3)}$ may be combined at the feedback capacitor 622*a*. In a similar way, the negative signal components of the phase-shifted conditioned signal $\mathbf{547}_{(0)}$, $\mathbf{547}_{(1)}$, $\mathbf{547}_{(2)}$, and $\mathbf{547}_{(3)}$ may be sampled onto capacitors of the DAC 614*b* and combined at the feedback capacitor 622*b*. As such, the residual amplifier circuitry 620 may operate as a summing node (e.g., the summer 380 of FIG. 3), removing the need for specific summing circuitry such as the summing circuitry 410 of FIG. 4. In some embodiments, the pipelined ADC 630 may include switching elements between each of the first stage ADCs 610*a* and 610*b* and the residual amplifier circuitry 620 to control when the charges on the DACs 614*a* and 614*b* may be transferred to the feedback capacitors 622*a* and 622*b*.

Subsequently, the second stage ADC 640 may receive the combined phase-shifted conditioned signals 547 from the different phase-shifts and convert the combined phase-shifted conditioned signals 547 into digital signals, for example, for processing by a digital baseband similar to the digital baseband 120 discussed above with reference to FIG. 1. As discussed above, in some embodiments, the pipelined ADC 630 may include additional ADC stages. In such embodiments, the second stage ADC 640 may determine a digital code based on the combined phase-shifted conditioned signals 547, convert the digital code to an analog signal, and subtract the analog signal from the combined phase-shifted conditioned signals 547 (received at the input of the second stage ADC 640) to provide a residual signal to a next ADC stage for conversion.

Figure 7:
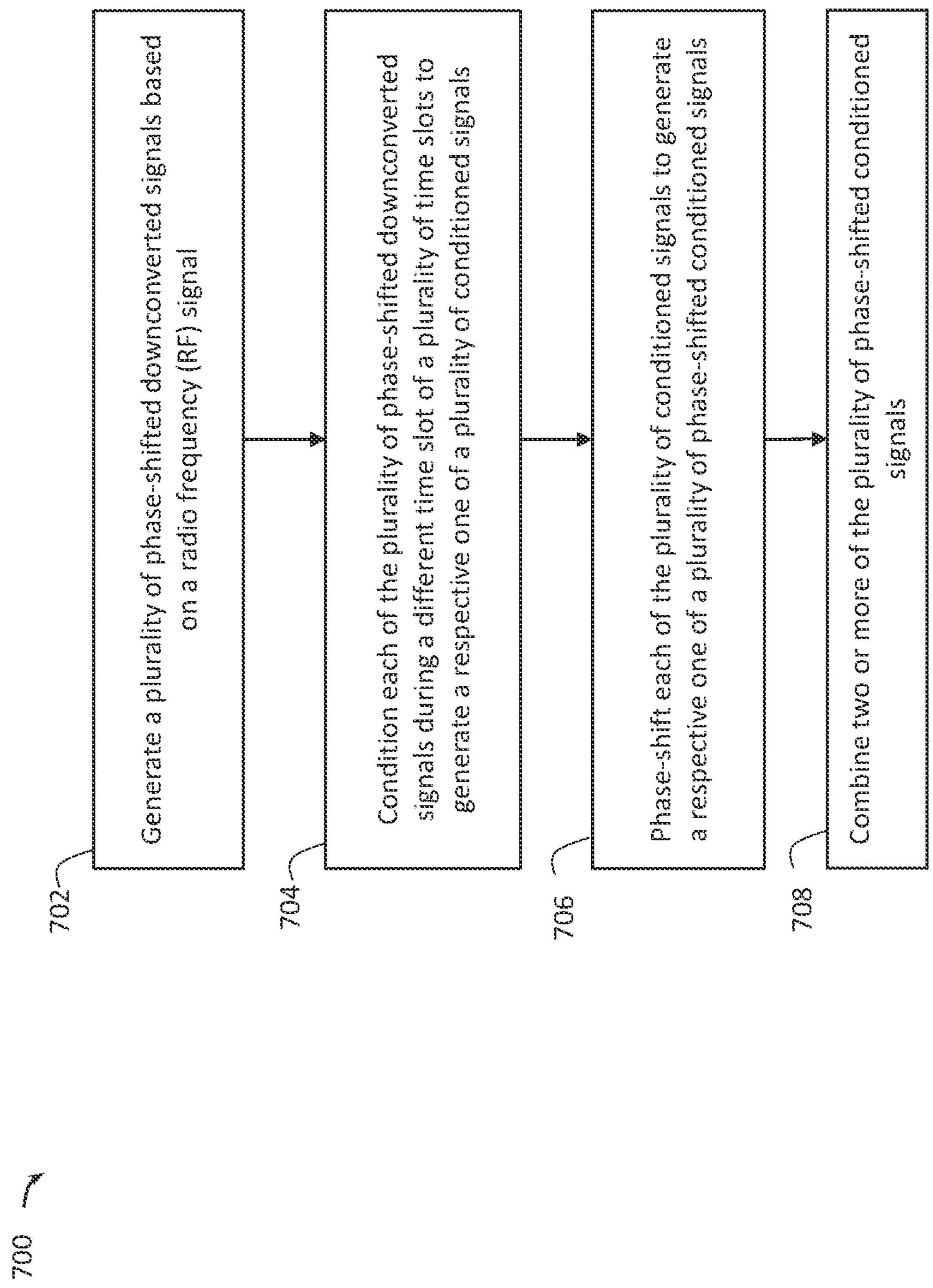
FIG. 7 is a flow diagram illustrating an exemplary method for performing linearization on a receiver chain, according to some embodiments of the present disclosure.

Example Method for Time-Interleaved Polyphase Mixing-Based Receive Signal Chain Linearization FIG. 7 is a flow diagram illustrating an exemplary method 700 for performing linearization on a receiver chain, according to some embodiments of the present disclosure. The method 700 can be implemented by a receive signal chain including nonlinear circuitry. Although the operations of the method 700 may be illustrated with reference to particular embodiments of the receive signal chains 200, 400, and/or 500 disclosed herein, the method 700 may be performed using any suitable hardware components and/or software components. The method 700 may utilize similar mechanisms as discussed above with reference to FIGS. 2-4, 5A-5C, and 6. Operations are illustrated once each and in a particular order in FIG. 7, but the operations may be performed in parallel, reordered, and/or repeated as desired.

At 702, a plurality of phase-shifted downconverted signals (e.g., the signals 223, 312, 322, and 332) may be generated based on an RF signal using a plurality of polyphase mixer circuitries having first mixers and first local oscillators. For instance, the plurality of polyphase mixer circuitries may be part of a receive signal chain similar to the receive signal chains 200, 400, and/or 500, and the RF signal may be received via receive antenna(s) coupled to the receive signal chain. In some embodiments, the generating the plurality of phase-shifted downconverted signals at 702 may include mixing the RF signal with each of a plurality of local oscillation signals of different phases using the first mixers and the first local oscillators. In some embodiments, the plurality of polyphase mixer circuitry may correspond to the polyphase mixer circuitry 220, the first mixers may correspond to the mixers 222, and the first local oscillators may correspond to the LOs 224 discussed above with reference to FIGS. 2 and 4.

At 704, each of the plurality of phase-shifted downconverted signals may be conditioned during a different time slot of a plurality of time slots to generate a respective one of a plurality of conditioned signals (e.g., the signals 237, 342, 346, and/or 537). The conditioning may be performed using signal conditioning circuitry including at least one nonlinear component (e.g., DSA such as the DSA 110, TIAs and/or filters such as the TIA and/or filtering stages 230 and 516).

At 706, each of the plurality of conditioned signals may be phase-shifted to generate a respective one of a plurality of phase-shifted conditioned signals (e.g., the signals 247 and 547). The phase-shifting may be performed using further polyphase mixer circuitry comprising a second mixer and second local oscillators. In some embodiments, the further polyphase mixer circuitry may correspond to the polyphase mixer circuitry 240, the second mixer may correspond to the mixers 242, and the second local oscillators may correspond to the LOs 246 as discussed above with reference to FIGS. 2 and 4. In other embodiments the further polyphase mixer circuitry may correspond to the polyphase mixer circuitry 520, the second mixer may correspond to the mixers 522, and the second local oscillators may correspond to the LOs 526 as discussed above with reference to FIG. 5.

At 708, two or more of the plurality of phase-shifted conditioned signals may be combined, for example, to provide a signal with reduced nonlinearity for subsequent processing.

In some embodiments, a first conditioned signal of the plurality of conditioned signals at 704 is generated during a first time slot of the plurality of time slots based on a first of the plurality of phase-shifted downconverted signals associated with a first local oscillation signal of the plurality of local oscillation signals. Further, the phase-shifting each of the plurality of conditioned signals at 706 may include mixing, during the first time slot via the second mixer and a respective one of the second local oscillators, the first conditioned signal with a second local oscillation signal having a phase opposite of a phase of the first local oscillation signal. For instance, the first local oscillation signal may have a phase of 120°, and the second local oscillation signal may have a phase of −120°.

In some embodiments, the method 700 may further include charging each of a plurality of capacitors based on a respective one of the two or more phase-shifted conditioned signals, where the combining the two or more phase-shifted conditioned signals at 708 may include summing charges stored on the plurality of capacitors. In some embodiments, the plurality of capacitors may correspond to the capacitors 414, 416, and 418 discussed above with reference to FIG. 4.

In some embodiments, the combining the two or more phase-shifted conditioned signals at 708 may include generating a digital output based on the two or more phase-shifted conditioned signals using an ADC. In a first embodiment, the ADC may be a SAR ADC including a CAPDAC. The SAR ADC may correspond to the SAR ADC 530 and the CAPDAC may correspond to the P-DAC 540 or the N-DAC 550 discussed above with reference to FIGS. 5A and 5B. Further, the combining the two or more phase-shifted conditioned signals at 708 may include sampling, during a first sampling time, one of the two or more phase-shifted conditioned signals onto a first set of capacitors of the CAPDAC. The combining the two or more phase-shifted conditioned signals at 708 may further include sampling, during a second sampling time different from the first sampling time, a different one of the two or more phase-shifted conditioned signals onto a second set of capacitors of the CAPDAC. The second set of capacitors may be different from the first set of capacitors. The combining the two or more phase-shifted conditioned signals at 708 may further include generating the digital output based on a combined charges sampled by the first set of capacitors and the second sets of capacitors. As an example, the first set of capacitors may correspond to the capacitor set 543*a*, and the second set of capacitors may correspond to the capacitor set 543*b*. Further, the first sampling time may correspond to one of the phases $\Phi_1$, $\Phi_2$, $\Phi_3$, and $\Phi_4$ while the select signal 582 is a logic high, and the second sampling time may correspond to one of the phases $\Phi_1$, $\Phi_2$, $\Phi_3$, and $\Phi_4$ while the select signal 584 is a logic high as discussed above with reference to FIG. 5C. In a second embodiment, the ADC may be a pipelined ADC including a CAPDAC. The pipelined ADC may correspond to the pipelined ADC 630 and the CAPDAC may correspond to the DAC 614*a* or the DAC 614*b* discussed above with reference to FIG. 6.

EXAMPLES

In Example 1, an apparatus includes input node to receive an input signal, a signal path coupled to the input node, the signal path including at least one nonlinear component; and analog linearization circuitry coupled to the signal path, the analog linearization circuitry including a plurality of polyphase mixer circuitries coupled to the input node, the plurality of polyphase mixer circuitries including first mixers and first local oscillators; and a first multiplexer including inputs coupled to outputs of the first mixers of the plurality of polyphase mixer circuitries; and an output coupled to a first node on the signal path, where the first node is upstream of the at least one nonlinear component In Example 2, the apparatus of Example 1 can optionally include a low-noise amplifier (LNA) coupled to the input node, where the signal path further includes an analog-to-digital converter (ADC) downstream of the at least one nonlinear component.

In Example 3, the apparatus of any of Examples 1-2 can optionally include where a number of the first mixers in the plurality of polyphase mixer circuitries is at least 3, and where each of the first mixers is coupled to one of the first local oscillators.

In Example 4, the apparatus of any of Examples 1-3 can optionally include where the at least one nonlinear component includes at least one of a transimpedance amplifier, filtering circuitry, or a digital step attenuator.

In Example 5, the apparatus of any of Examples 1-4 can optionally include where the analog linearization circuitry further includes further polyphase mixer circuitry coupled between a second node and a third node on the signal path, where the second node and the third node are downstream of the at least one nonlinear component; and the further polyphase mixer circuitry includes second local oscillators; a second multiplexer including inputs coupled to the second local oscillators; and a second mixer including inputs coupled to an output of the second multiplexer and the second node on the signal path; and an output coupled to the third node on the signal path.

In Example 6, the apparatus of any of Examples 1-5 can optionally include where the first local oscillators of the plurality of polyphase mixer circuitries generate first local oscillation signals having different phases; the second local oscillators of the further polyphase mixer circuitry generate second local oscillation signals having different phases; and at least one of first local oscillation signals and one of the second local oscillation signals have opposite phases.

In Example 7, the apparatus of any of Examples 1-6 can optionally include where the analog linearization circuitry further includes path selection circuitry to generate a select signal in each time slot of a plurality of time slots; the first multiplexer selectively couples, based on the select signal, one of the first local oscillators and an associated one of the first mixers to the signal path; and the second multiplexer selectively couples, based on the select signal, one of the second local oscillators to the second mixer.

In Example 8, the apparatus of any of Examples 1-6 can optionally include where the signal path further includes summing circuitry coupled to the output of the second mixer, the summing circuitry including a demultiplexer including an input coupled to the third node; and a plurality of capacitors coupled between an output of the demultiplexer and a fourth node on the signal path, where each of the plurality of capacitors is associated with one of the second local oscillators.

In Example 9, the apparatus of any of Examples 1-6 can optionally include where the signal path further includes a successive approximation analog-to-digital converter (SAR ADC) coupled to the output of the second mixer; the SAR ADC includes a capacitive digital-to-analog-converter (DAC); and the capacitive DAC includes a comparator; and a plurality of parallel paths, each including a plurality of switches; and a plurality of capacitors, each having a first plate coupled to an input of the comparator and a second plate coupled to a subset of the plurality of switches.

In Example 10, the apparatus of Example 9 can optionally include where the second multiplexer selectively couples each of the second local oscillators to the second mixer based on a respective one of select signals; and the plurality of switches in each of the plurality of parallel paths are responsive to at least an associated one of the select signals of the second multiplexer.

In Example 11, the apparatus of any of Examples 1-6 can optionally include where the signal path further includes a pipelined analog-to-digital converter (ADC) coupled to the output of the second mixer; the pipelined ADC includes at least two ADC stages; and residual amplifier circuitry coupled between the two ADC stages, the residual amplifier circuitry including an amplifier; and one or more feedback capacitors coupled to the amplifier.

In Example 12, the apparatus of Example 11 can optionally include where a first ADC stage of the at least two ADC stages includes a coarse ADC and a capacitive digital-to-analog converter (DAC).

In Example 13, a radio frequency (RF) transceiver analog frontend with nonlinearity cancellation, the RF transceiver analog frontend including an input node to receive an RF signal; a plurality of polyphase mixer circuitries including first mixers and first local oscillators to generate a plurality of phase-shifted downconverted signals based on the received RF signal; a first multiplexer to select one of the plurality of phase-shifted downconverted signals during each time slot of a plurality of time slots; signal conditioning circuitry including at least one nonlinear component, the signal conditioning circuitry to condition, during each time slot, a respective selected one of the plurality of phase-shifted downconverted signals to generate a conditioned signal; and analog-to-digital-converter (ADC) downstream of the signal conditioning circuitry.

In Example 14, the RF transceiver analog frontend of Example 13 can optionally include where the at least one nonlinear component of the signal conditioning circuitry includes at least one of a transimpedance amplifier, filtering circuitry, or a digital step attenuator.

In Example 15, the RF transceiver analog frontend of any of Examples 13-14 can optionally include further polyphase mixer circuitry including a second mixer, a second multiplexer, and second local oscillators to phase-shift, during each time slot, the conditioned signal to generate a phase-shifted conditioned signal.

In Example 16, the RF transceiver analog frontend of any of Examples 13-15 can optionally include where first local oscillators of the plurality of polyphase mixer circuitries generate first local oscillation signals having different phases; the second local oscillators of the further polyphase mixer circuitry generate second local oscillation signals having different phases; and at least one of first local oscillation signals and one of the second local oscillation signals have opposite phases.

In Example 17, the RF transceiver analog frontend of any of Examples 13-16 can optionally include path selection circuitry to generate a select signal for each time slot, where the first multiplexer selectively couples, based on the select signal, a respective one of the first local oscillators and an associated one of the first mixers to the signal conditioning circuitry; and the second multiplexer selectively couples, based on the select signal, a respective one of the second local oscillators to the second mixer.

In Example 18, the RF transceiver analog frontend of any of Examples 13-17 can optionally include where the ADC includes a successive approximation register (SAR) analog-to-digital converter (ADC) including a capacitive digital-to-analog-converter (CAPDAC); and the capacitive DAC includes multiple sets of capacitors; and a plurality of switches to selectively sample each phase-shifted conditioned signal onto one set of the multiple sets of capacitors.

In Example 19, the RF transceiver analog frontend of any of Examples 13-17 can optionally include where the ADC includes a pipelined analog-to-digital converter (ADC) including a first ADC stage including a capacitive digital-to-analog converter (CAPDAC), where each of the phase-shifted conditioned signals charges a different set of capacitors at the CAPDAC; a second ADC stage; and residual amplifier circuitry coupled between the first and second ADC stages, the residual amplifier circuitry including an amplifier; and at least one feedback capacitor coupled between an input and an output of the amplifier, the at least one feedback capacitor to integrate charges at the different set of capacitors.

In Example 20, a method for performing linearization on a receiver chain. The method includes generating, via a plurality of polyphase mixer circuitries having first mixers and first local oscillators, a plurality of phase-shifted downconverted signals based on a radio frequency (RF) signal; conditioning, via signal conditioning circuitry including at least one nonlinear component, each of the plurality of phase-shifted downconverted signals during a different time slot of a plurality of time slots to generate a respective one of a plurality of conditioned signals; and phase-shifting, via further polyphase mixer circuitry including a second mixer and second local oscillators, each of the plurality of conditioned signals to generate a respective one of a plurality of phase-shifted conditioned signals; and combining two or more phase-shifted conditioned signals of the plurality of phase-shifted conditioned signals.

In Example 21, the method of Example 20 can optionally include where the generating the plurality of phase-shifted downconverted signals includes mixing, via the first mixers and the first local oscillators, the RF signal with each of a plurality of local oscillation signals of different phases.

In Example 22, the method of any of Examples 20-21 can optionally include where a first conditioned signal of the plurality of conditioned signals is generated during a first time slot of the plurality of time slots based on a first of the plurality of phase-shifted downconverted signals associated with a first local oscillation signal of the plurality of local oscillation signals; and the phase-shifting each of the plurality of conditioned signals includes mixing, during the first time slot via the second mixer and a respective one of the second local oscillators, the first conditioned signal with a second local oscillation signal having a phase opposite of a phase of the first local oscillation signal.

In Example 23, the method of any of Examples 20-22 can optionally include charging each of a plurality of capacitors based on a respective one of the two or more phase-shifted conditioned signals, where the combining the two or more phase-shifted conditioned signals includes summing charges stored on the plurality of capacitors.

In Example 24, the method of any of Examples 20-22, where the combining the two or more phase-shifted conditioned signals includes generating, via an analog-to-digital converter (ADC), a digital output based on the two or more phase-shifted conditioned signals.

In Example 25, the method of Example 24 can optionally include where the ADC includes a capacitive digital-to-analog converter (CAPDAC); and the combining the two or more phase-shifted conditioned signals includes sampling, during a first sampling time, one of the two or more phase-shifted conditioned signals onto a first set of capacitors of the CAPDAC; sampling, during a second sampling time different from the first sampling time, a different one of the two or more phase-shifted conditioned signals onto a second set of capacitors of the CAPDAC, the second set of capacitors different from the first set of capacitors; and generating the digital output based on a combined charges sampled by the first set of capacitors and the second sets of capacitors.

In Example 26, the method of Example 25 can optionally include where the ADC is a SAR ADC.

In Example 27, the method of Example 2 can optionally include where the ADC is a pipelined ADC.

Variations and Implementations

While embodiments of the present disclosure were described above with references to exemplary implementations as shown in FIGS. 1-4, 5A-5C, and 6-7, a person skilled in the art will realize that the various teachings described above are applicable to a large variety of other implementations.

In certain contexts, the features discussed herein can be applicable to automotive systems, safety-critical industrial applications, medical systems, scientific instrumentation, wireless and wired communications, radio, radar, industrial process control, audio and video equipment, current sensing, instrumentation (which can be highly precise), and other digital-processing-based systems.

In the discussions of the embodiments above, components of a system, such as TIAs, filters, converters, mixers, LOs, multiplexers, demultiplexers, and/or other components can readily be replaced, substituted, or otherwise modified to accommodate particular circuitry needs. Moreover, it should be noted that the use of complementary electronic devices, hardware, software, etc., offer an equally viable option for implementing the teachings of the present disclosure related to receive signal chain with time-interleaved polyphase linearization, in various communication systems.

Parts of various systems for implementing time-interleaved polyphase linearized receive signal chain as proposed herein can include electronic circuitry to perform the functions described herein. In some cases, one or more parts of the system can be provided by a processor specially configured for carrying out the functions described herein. For instance, the processor may include one or more application specific components, or may include programmable logic gates which are configured to carry out the functions describe herein. The circuitry can operate in analog domain, digital domain, or in a mixed-signal domain. In some instances, the processor may be configured to carrying out the functions described herein by executing one or more instructions stored on a non-transitory computer-readable storage medium.

In one example embodiment, any number of electrical circuits of the present figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of DSPs, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the present figures may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often RF functions: all of which may be provided on a single chip substrate. Other embodiments may include a multi-chip-module (MCM), with a plurality of separate ICs located within a single electronic package and configured to interact closely with each other through the electronic package.

It is also imperative to note that all of the specifications, dimensions, and relationships outlined herein (e.g., the number of components of receive signal chains shown in FIGS. 1-2, 4, 5A, and/or ADCs shown in FIGS. 5B and 6) have only been offered for purposes of example and teaching only. Such information may be varied considerably without departing from the spirit of the present disclosure, or the scope of the appended claims. It should be appreciated that the system can be consolidated in any suitable manner. Along similar design alternatives, any of the illustrated circuits, components, modules, and elements of the present figures may be combined in various possible configurations, all of which are clearly within the broad scope of this specification. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Various aspects of the illustrative embodiments are described using terms commonly employed by those skilled in the art to convey the substance of their work to others skilled in the art. For example, the term "connected" means a direct electrical connection between the things that are connected, without any intermediary devices/components, while the term "coupled" means either a direct electrical connection between the things that are connected, or an indirect connection through one or more passive or active intermediary devices/components. In another example, the term "circuit" means one or more passive and/or active components that are arranged to cooperate with one another to provide a desired function. Also, as used herein, the terms "substantially," "approximately," "about," etc., may be used to generally refer to being within +/−20% of a target value, e.g., within +/−10% of a target value, based on the context of a particular value as described herein or as known in the art.

Numerous other changes, substitutions, variations, alterations, and modifications may be ascertained to one skilled in the art and it is intended that the present disclosure encompass all such changes, substitutions, variations, alterations, and modifications as falling within the scope of the examples and appended claims. Note that all optional features of the apparatus described above may also be implemented with respect to the method or process described herein and specifics in the examples may be used anywhere in one or more embodiments.

The invention claimed is:

1. An apparatus comprising:
- an input node to receive an input signal;
- a signal path coupled to the input node, the signal path comprising at least one nonlinear component; and
- analog linearization circuitry coupled to the signal path, the analog linearization circuitry comprising:
  - a plurality of polyphase mixer circuitries coupled to the input node, the plurality of polyphase mixer circuitries comprising first mixers and first local oscillators; and
  - a first multiplexer comprising:
    - inputs coupled to outputs of the first mixers of the plurality of polyphase mixer circuitries; and
    - an output coupled to a first node on the signal path, wherein the first node is upstream of the at least one nonlinear component.

2. The apparatus of claim 1, further comprising:
- a low-noise amplifier (LNA) coupled to the input node,
- wherein the signal path further comprises an analog-to-digital converter (ADC) downstream of the at least one nonlinear component.

3. The apparatus of claim 1, wherein the at least one nonlinear component comprises at least one of a transimpedance amplifier, filtering circuitry, or a digital step attenuator.

4. The apparatus of claim 1, wherein:
- the analog linearization circuitry further comprises further polyphase mixer circuitry coupled between a second node and a third node on the signal path, wherein the second node and the third node are downstream of the at least one nonlinear component; and
- the further polyphase mixer circuitry comprises:
  - second local oscillators;
  - a second multiplexer comprising inputs coupled to the second local oscillators; and
  - a second mixer comprising:
    - inputs coupled to an output of the second multiplexer and the second node on the signal path; and
    - an output coupled to the third node on the signal path.

5. The apparatus of claim 4, wherein:
- the first local oscillators of the plurality of polyphase mixer circuitries generate first local oscillation signals having different phases;
- the second local oscillators of the further polyphase mixer circuitry generate second local oscillation signals having different phases; and
- at least one of first local oscillation signals and one of the second local oscillation signals have opposite phases.

6. The apparatus of claim 4, wherein:
- the analog linearization circuitry further comprises path selection circuitry to generate a select signal in each time slot of a plurality of time slots;
- the first multiplexer selectively couples, based on the select signal, one of the first local oscillators and an associated one of the first mixers to the signal path; and
- the second multiplexer selectively couples, based on the select signal, one of the second local oscillators to the second mixer.

7. The apparatus of claim 4, wherein the signal path further comprises summing circuitry coupled to the output of the second mixer, the summing circuitry comprising:
- a demultiplexer comprising an input coupled to the third node; and
- a plurality of capacitors coupled between an output of the demultiplexer and a fourth node on the signal path, wherein each of the plurality of capacitors is associated with one of the second local oscillators.

8. The apparatus of claim 4, wherein:
- the signal path further comprises a successive approximation analog-to-digital converter (SAR ADC) coupled to the output of the second mixer;

the SAR ADC comprises a capacitive digital-to-analog-converter (DAC); and the capacitive DAC comprises:

a comparator; and a plurality of parallel paths, each comprising:

a plurality of switches; and a plurality of capacitors, each having a first plate coupled to an input of the comparator and a second plate coupled to a subset of the plurality of switches.

9. The apparatus of claim 8, wherein:

the second multiplexer selectively couples each of the second local oscillators to the second mixer based on a respective one of select signals; and the plurality of switches in each of the plurality of parallel paths are responsive to at least an associated one of the select signals of the second multiplexer.

10. The apparatus of claim 4, wherein:

the signal path further comprises a pipelined analog-to-digital converter (ADC) coupled to the output of the second mixer;

the pipelined ADC comprises:

at least two ADC stages; and residual amplifier circuitry coupled between the two ADC stages, the residual amplifier circuitry comprising:

an amplifier; and one or more feedback capacitors coupled to the amplifier.

11. An analog frontend for a radio frequency (RF) transceiver, the analog frontend comprising:

an input node to receive an RF signal;

a plurality of polyphase mixer circuitries comprising first mixers and first local oscillators to generate a plurality of phase-shifted downconverted signals based on the received RF signal;

a first multiplexer to select one of the plurality of phase-shifted downconverted signals during each time slot of a plurality of time slots;

signal conditioning circuitry comprising at least one non-linear component, the signal conditioning circuitry to condition, during each time slot, a respective selected one of the plurality of phase-shifted downconverted signals to generate a conditioned signal; and analog-to-digital-converter (ADC) downstream of the signal conditioning circuitry.

12. The analog frontend of claim 11, wherein the at least one nonlinear component of the signal conditioning circuitry comprises at least one of a transimpedance amplifier, filtering circuitry, or a digital step attenuator.

13. The analog frontend of claim 11, further comprising:

further polyphase mixer circuitry comprising a second mixer, a second multiplexer, and second local oscillators to phase-shift, during each time slot, the conditioned signal to generate a phase-shifted conditioned signal.

14. The analog frontend of claim 13, wherein:

the first local oscillators of the plurality of polyphase mixer circuitries generate first local oscillation signals having different phases;

the second local oscillators of the further polyphase mixer circuitry generate second local oscillation signals having different phases; and at least one of first local oscillation signals and one of the second local oscillation signals have opposite phases.

15. The analog frontend of claim 11, wherein:

the ADC comprises a successive approximation register (SAR) analog-to-digital converter (ADC) comprising a capacitive digital-to-analog-converter (CAPDAC); and the capacitive DAC comprises:

multiple sets of capacitors; and a plurality of switches to selectively sample each phase-shifted conditioned signal onto one set of the multiple sets of capacitors.

16. A method for performing linearization on a receiver chain, the method comprising:

generating, via a plurality of polyphase mixer circuitries having first mixers and first local oscillators, a plurality of phase-shifted downconverted signals based on a radio frequency (RF) signal;

conditioning, via signal conditioning circuitry comprising at least one nonlinear component, each of the plurality of phase-shifted downconverted signals during a different time slot of a plurality of time slots to generate a respective one of a plurality of conditioned signals; and phase-shifting, via further polyphase mixer circuitry comprising a second mixer and second local oscillators, each of the plurality of conditioned signals to generate a respective one of a plurality of phase-shifted conditioned signals; and combining two or more phase-shifted conditioned signals of the plurality of phase-shifted conditioned signals.

17. The method of claim 16, wherein the generating the plurality of phase-shifted downconverted signals comprises:

mixing, via the first mixers and the first local oscillators, the RF signal with each of a plurality of local oscillation signals of different phases.

18. The method of claim 17, wherein:

a first conditioned signal of the plurality of conditioned signals is generated during a first time slot of the plurality of time slots based on a first of the plurality of phase-shifted downconverted signals associated with a first local oscillation signal of the plurality of local oscillation signals; and the phase-shifting each of the plurality of conditioned signals comprises:

mixing, during the first time slot via the second mixer and a respective one of the second local oscillators, the first conditioned signal with a second local oscillation signal having a phase opposite of a phase of the first local oscillation signal.

19. The method of claim 16, further comprising:

charging each of a plurality of capacitors based on a respective one of the two or more phase-shifted conditioned signals, wherein the combining the two or more phase-shifted conditioned signals comprises:

summing charges stored on the plurality of capacitors.

20. The method of claim 16, wherein the combining the two or more phase-shifted conditioned signals comprises:

sampling, during a first sampling time, one of the two or more phase-shifted conditioned signals onto a first set of capacitors of a capacitive digital-to-analog converter (CAPDAC) within an analog-to-digital converter (ADC);

sampling, during a second sampling time different from the first sampling time, a different one of the two or more phase-shifted conditioned signals onto a second set of capacitors of the CAPDAC, the second set of capacitors different from the first set of capacitors; and generating a digital output based on combined charges sampled by the first set of capacitors and the second set of capacitors.

* * * * *